United States Patent
Tsai et al.

(10) Patent No.: US 9,019,635 B2
(45) Date of Patent: Apr. 28, 2015

(54) OPTICAL IMAGING LENS ASSEMBLY AND OPTICAL IMAGING DEVICE

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 70 days.

(21) Appl. No.: 14/055,567

(22) Filed: Oct. 16, 2013

(65) Prior Publication Data

US 2015/0054994 A1    Feb. 26, 2015

(30) Foreign Application Priority Data

Aug. 23, 2013    (TW) .............................. 102130358 A

(51) Int. Cl.
    *G02B 9/62*    (2006.01)
    *G02B 3/04*    (2006.01)

(52) U.S. Cl.
    CPC ... *G02B 9/62* (2013.01); *G02B 3/04* (2013.01)

(58) Field of Classification Search
    CPC ............... G02B 9/00; G02B 9/62; G02B 9/64
    USPC .................................. 359/708, 713, 754–757
    See application file for complete search history.

(56) References Cited

U.S. PATENT DOCUMENTS

| | | |
|---|---|---|
| 2013/0342918 A1 | 12/2013 | Kubota et al. |
| 2014/0063323 A1 | 3/2014 | Yamazaki et al. |
| 2014/0078603 A1 | 3/2014 | You |
| 2014/0211326 A1 | 7/2014 | Lai |
| 2014/0218582 A1* | 8/2014 | Chen et al. ..................... 348/335 |
| 2014/0327807 A1* | 11/2014 | Chen et al. ..................... 348/335 |
| 2014/0327808 A1* | 11/2014 | Chen et al. ..................... 348/335 |

FOREIGN PATENT DOCUMENTS

CN    202975455 U    6/2013

OTHER PUBLICATIONS

Intellectual Property Office, Ministry of Economic Affairs, R.O.C., "Office Action", Oct. 21, 2014, Taiwan.

* cited by examiner

*Primary Examiner* — Darryl J Collins
(74) *Attorney, Agent, or Firm* — Tim Tingkang Xia, Esq.; Morris, Manning & Martin, LLP

(57) ABSTRACT

An optical imaging lens assembly includes, in order from the object side to the image side, a first lens element, a second lens element, a third lens element, a fourth lens element, a fifth lens element and a sixth lens element. The first lens element with positive refractive power has a convex object-side surface in a paraxial region. The fourth lens element with negative refractive power has a concave object-side surface in a paraxial region. The fifth lens element with positive refractive power has a convex image-side surface in a paraxial region. The sixth lens element with negative refractive power has a concave object-side surface in a paraxial region, a concave image-side surface in a paraxial region and at least one convex shape in the off-axial region of the image-side surface of the sixth lens element. The fifth lens element and the sixth lens element are aspheric lens elements.

23 Claims, 19 Drawing Sheets

OPTICAL IMAGING LENS ASSEMBLY AND OPTICAL IMAGING DEVICE

RELATED APPLICATIONS

The application claims priority to Taiwan Application Serial Number 102130358, filed Aug. 23, 2013, which is incorporated by reference herein in its entirety.

BACKGROUND

1. Technical Field

The present disclosure relates to an optical imaging lens assembly and optical imaging device. More particularly, the present disclosure relates to a compact optical imaging lens assembly and a compact optical imaging device.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element or a five-element lens structure. Due to the popularity of mobile products with high-end specifications, the requirements for high resolution and image quality of present compact optical systems increase significantly. However, the conventional optical systems cannot satisfy these requirements of the compact optical systems.

Conventional compact optical systems with six-element lens structure for compact electronic products have limitations in having a good balance between correcting aberrations and reducing the total track length.

SUMMARY

According to one aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has a convex object-side surface in a paraxial region. The second lens element has refractive power, and the third lens element has refractive power. The fourth lens element with negative refractive power has a concave object-side surface in a paraxial region. The fifth lens element with positive refractive power has a convex image-side surface in a paraxial region, wherein both of an object-side surface and the image-side surface of the fifth lens element are aspheric. The sixth lens element with negative refractive power has a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric. The optical imaging lens assembly has a total of six lens elements with refractive power. A curvature radius of the object-side surface of the fourth lens element is R7, a curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, and the following relationships are satisfied:

$-1.0 < (R11+R12)/(R11-R12) < 0.30;$ $-2.5 < R10/f < 0;$ and $-0.8 < R7/f < 0.$

According to another aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has a convex object-side surface in a paraxial region. The second lens element has refractive power, the third lens element has refractive power, and the fourth lens element has negative refractive power. The fifth lens element with positive refractive power has a convex image-side surface in a paraxial region, wherein both of an object-side surface and the image-side surface of the fifth lens element are aspheric. The sixth lens element with negative refractive power has a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric. The optical imaging lens assembly has a total of six lens elements with refractive power. The optical imaging lens assembly further comprises a stop disposed between an object and the second lens element. A curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, an axial distance between the stop and the image-side surface of the sixth lens element is SD, an axial distance between the object-side surface of the first lens element and the image-side surface of the sixth lens element is TD, and the following relationships are satisfied:

$-1.0 < (R11+R12)/(R11-R12) < 0.30;$ $-1.2 < R10/f < 0;$ and $0.82 < SD/TD < 1.0.$ According to another aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has a convex object-side surface in a paraxial region. The second lens element has refractive power, and the third lens element has refractive power. The fourth lens element has refractive power, and both of an object-side surface and an image-side surface of the fourth lens element are aspheric. The fifth lens element with positive refractive power has a convex image-side surface in a paraxial region, wherein both of an object-side surface and the image-side surface of the fifth lens element are aspheric. The sixth lens element with negative refractive power has a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric. The optical imaging lens assembly has a total of six lens elements with refractive power and an air distance exists between each lens element on an optical axis. The optical imaging lens assembly further comprises a stop disposed between an object and the second lens element. A curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, a focal length of the fifth lens element is f5, a focal length of the sixth lens element is f6, and the following relationships are satisfied:

$-1.0<(R11+R12)/(R11-R12)<0.30;$ $-2.5<R10/f<0;$ and $-1.30<f5/f6<-0.50.$

According to the other aspect of the present disclosure, an optical imaging device includes, in order from an object side to an image side, includes an optical imaging lens assembly and an image sensor. The optical imaging lens assembly includes, in order from an object side to an image side, includes a first lens element, a second lens element, a third lens element, a fourth lens element, a fifth lens element and a sixth lens element. The first lens element with positive refractive power has a convex object-side surface in a paraxial region. The second lens element has refractive power, and the third lens element has refractive power. The fourth lens element has refractive power, and both of an object-side surface and an image-side surface of the fourth lens element are aspheric. The fifth lens element with positive refractive power has a convex image-side surface in a paraxial region, wherein both of an object-side surface and the image-side surface of the fifth lens element are aspheric. The sixth lens element with negative refractive power has a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric. The optical imaging lens assembly has a total of six lens elements with refractive power and an air distance exists between each lens element on an optical axis. The optical imaging lens assembly further comprises a stop disposed between an object and the second lens element. A curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, a focal length of the fifth lens element is f5, a focal length of the sixth lens element is f6, and the following relationships are satisfied:

$-1.0<(R11+R12)/(R11-R12)<0.30;$ $-2.5<R10/f<0;$ and $-1.30<f5/f6<-0.50.$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
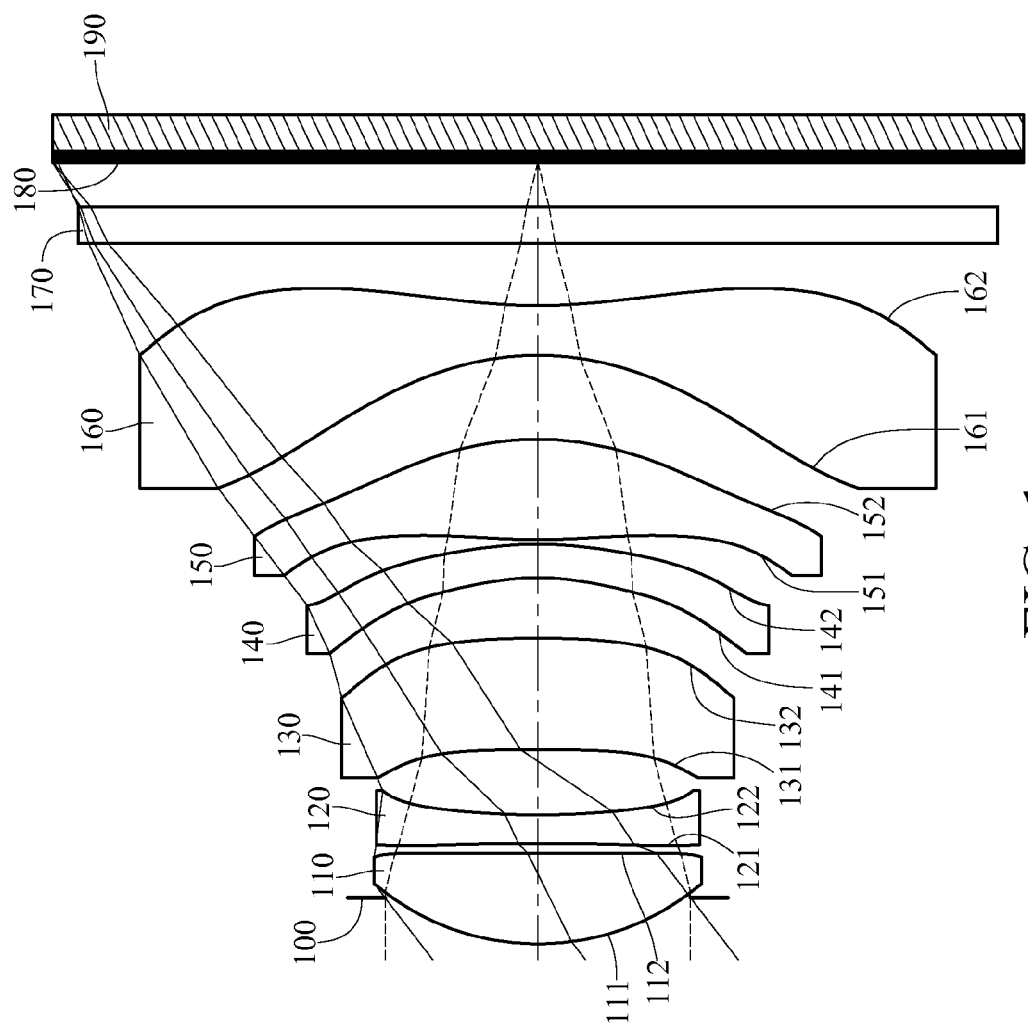
FIG. 1 is a schematic view of an optical imaging lens assembly according to the 1st embodiment of the present disclosure.

An optical imaging lens assembly includes, in order from an object side to an image side, a first lens element, a second lens element, a third lens element, a fourth lens element, a fifth lens element and a sixth lens element. The optical imaging lens assembly has a total of six lens elements with refractive power. Moreover, the optical imaging lens assembly further includes a stop and an image sensor, the stop is disposed between an object and the second lens element or between the object and the first lens element, and the image sensor is located on an image plane.

The first lens element has positive refractive power, so that it provides the optical imaging lens assembly with positive refractive power. Therefore, it is favorable for effectively reducing the total track length of the optical imaging lens assembly. The first lens element has a convex object-side surface in a paraxial region. Therefore, it is favorable for reducing the total track length.

The second lens element can have negative refractive power, so that it can correct aberrations generated by the first lens element. The second lens element can have a concave image-side surface in a paraxial region. Therefore, it is favorable for correcting the astigmatism.

The third lens element can have positive refractive power, so that it is favorable for reducing the sensitivity of the optical imaging lens assembly.

The fourth lens element can have negative refractive power, and the fourth lens element can have a concave object-side surface in a paraxial region and a convex image-side surface in a paraxial region, so that it is favorable for effectively correcting the astigmatism.

The fifth lens element with positive refractive power can have a convex object-side surface in a paraxial region and a convex image-side surface in a paraxial region, so that it can avoid excessive spherical aberrations.

The sixth lens element has negative refractive power, so that it is favorable for reducing the aberrations. The sixth lens element has a concave image-side surface in a paraxial region, so that the principal point of the optical imaging lens assembly can be positioned away from the image plane. Therefore, it is favorable for reducing the total track length so as to keep the optical imaging lens assembly compact. There is at least one convex shape in an off-axial region of the image-side surface of the sixth lens element, so that it is favorable for effectively correcting the aberrations of the off-axis.

An air distance exists between each lens element on an optical axis, so that it can avoid interference generated by assembling aspheric lens elements, and the difficulty of lens assembling can be reduced.

When a curvature radius of an object-side surface of the sixth lens element is R11, and a curvature radius of the image-side surface of the sixth lens element is R12, the following relationship is satisfied: $-1.0<(R11+R12)/(R11-R12)<0.30$. Therefore, it is favorable for effectively reducing the back focal length. Preferably, the following relationship is satisfied: $-1.0<(R11+R12)/(R11-R12)<0$. More preferably, the following relationship is satisfied: $-1.0<(R11+R12)/(R11-R12)<-0.25$.

When a curvature radius of the image-side surface of the fifth lens element is R10, and a focal length of the optical imaging lens assembly is f, the following relationship is satisfied: $-2.5<R10/f<0$. Therefore, t is favorable for effectively correcting the spherical aberration. Preferably, the following relationship is satisfied: $-1.2<R10/f<0$. More preferably, the following relationship is satisfied: $-0.8<R10/f<0$.

When a curvature radius of the object-side surface of the fourth lens element is R7, and the focal length of the optical imaging lens assembly is f, the following relationship is satisfied: $-0.8<R7/f<0$. Therefore, t is favorable for correcting the astigmatism.

When an axial distance between the stop and the image-side surface of the sixth lens element is SD, and an axial distance between the object-side surface of the first lens element and the image-side surface of the sixth lens element is TD, the following relationship is satisfied: $0.82<SD/TD<1.0$. Therefore, it can balance the telecentric feature and the wide field of view. Preferably, the following relationship is satisfied: $0.88<SD/TD<1.0$.

When a focal length of the fifth lens element is f5, and a focal length of the sixth lens element is f6, the following relationship is satisfied: $-1.30<f5/f6<-0.50$. Therefore, the distribution of refractive power is more balanced, which reduces the generation of aberrations.

When a refractive index of the first lens element is N1, the following relationship is satisfied: $1.45<N1<1.58$. Therefore, the arrangement of refractive index of the system is more balanced.

When the focal length of the optical imaging lens assembly is f, and the focal length of the sixth lens element is f6, the following relationship is satisfied: $-5<f/f6<-1.5$. Therefore, it is favorable for strengthening the aberration correction.

When a curvature radius of the image-side surface of the fourth lens element is R8, and the focal length of the optical imaging lens assembly is f, the following relationship is satisfied: $-1.2<R8/f<0$. Therefore, it is favorable for strengthening the correction of the astigmatism.

Figure 19:
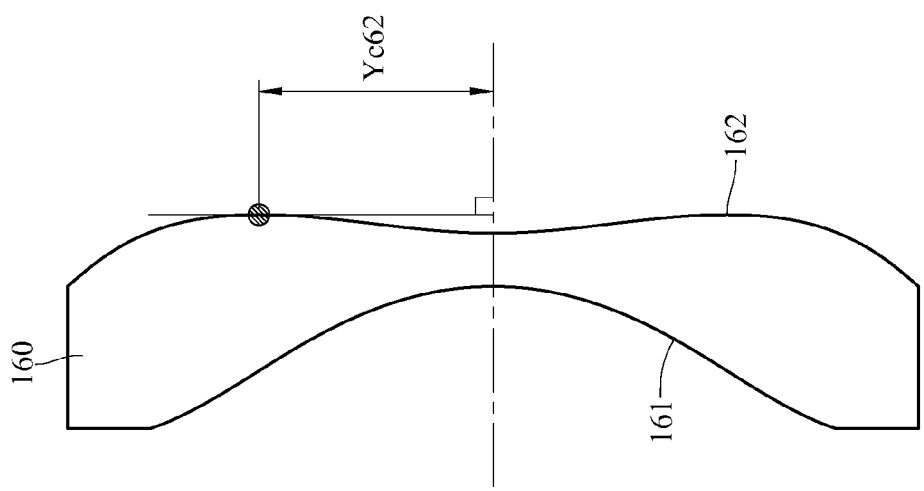
FIG. 19 is a schematic view of a parameter of the sixth lens element of the optical imaging lens assembly according to the FIG. 1.

When a vertical distance from the optical axis to a critical point on the image-side surface of the sixth lens element is Yc62, and the focal length of the optical imaging lens assembly is f, the following relationship is satisfied: $0.1<Yc62/f<0.7$. Therefore, the angle at which the light is projected onto the image sensor from the off-axis field can be favorably reduced to further increase the response efficiency of the image sensor. FIG. 19 is a schematic view of a parameter of the sixth lens element of the optical imaging lens assembly according to the FIG. 1. The critical point on the image-side surface of the sixth lens element is a point of tangency where a tangent plane through the point of tangency is vertical to the optical axis. The critical point is not configured on the optical axis.

When an f-number of the optical imaging lens assembly is Fno, the following relationship is satisfied: $1.40<Fno<2.45$. The optical imaging lens assembly has a sufficiently large aperture to capture clear images at higher shutter speeds when the light is not sufficient.

When an Abbe number of the first lens element is V1, an Abbe number of the second lens element is V2, and an Abbe number of the fourth lens element is V4, the following relationship is satisfied: $0<V1-(V2+V4)<30$. Therefore, the chromatic aberration of the optical imaging lens assembly can be corrected.

When a half of a diagonal length of an effective photosensitive area on the image sensor is ImgH, and an axial distance from the object-side surface of the first lens element to the image plane is TTL, the following relationship is satisfied: $TTL/ImgH<1.8$. Therefore, the total track length of the optical imaging lens assembly can be reduced, so as to maintain the compact size of the optical imaging lens assembly. As a result, the optical imaging lens assembly may be applied to lightweight and portable electronic products.

When the Abbe number of the second lens element is V2, the following relationship is satisfied: $10<V2<24.5$. Therefore, the chromatic aberration of the optical imaging lens assembly can be corrected.

When a central thickness of the fifth lens element is CT5, and a central thickness of the sixth lens element is CT6, the following relationship is satisfied: $0.5<CT5/CT6<2.45$. Therefore, it is favorable for enhancing the manufacturing yield rate.

When a distance in parallel with the optical axis from an axial vertex on the object-side surface of the sixth lens element to a maximum effective semi-diameter position on the object-side surface of the sixth lens element is SAG61(the distance in parallel with the optical axis from the axial vertex to the maximum effective diameter position in the image side direction is defined as a positive distance and vice versa), and an axial distance between the fifth lens element and the sixth lens element is T56, the following relationship is satisfied: $-2.3<SAG61/T56<-0.6$. Therefore, the shape of the sixth lens element is not excessively bent with an appropriate central thickness, which allows a tighter arrangement of the lens elements.

According to the present disclosure, an optical imaging device, in order from an object side to an image side, includes an optical imaging lens assembly and an image sensor. The optical imaging lens assembly, in order from an object side to an image side, includes a first lens element, a second lens element, a third lens element, a fourth lens element, a fifth lens element and a sixth lens element. The first lens element with positive refractive power has a convex object-side surface in a paraxial region. The second lens element has refractive power, and the third lens element has refractive power. The fourth lens element has refractive power, and both of an object-side surface and an image-side surface of the fourth lens element are aspheric. The fifth lens element with positive refractive power has a convex image-side surface in a paraxial region, wherein both of an object-side surface and the image-side surface of the fifth lens element are aspheric. The sixth lens element with negative refractive power has a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric. The optical imaging lens assembly has a total of six lens elements with refractive power and an air distance exists between each lens element on an optical axis. The optical imaging lens assembly further comprises a stop disposed between an object and the second lens element.

A curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, a focal length of the fifth lens element is f5, a focal length of the sixth lens element is f6, and the following relationships are satisfied: $-1.0<(R11+R12)/(R11-R12)<0.30$; $-2.5<R10/f<0$; and $-1.30<f5/f6<-0.50$. Accordingly, the sixth lens element has a concave object-side surface in a paraxial region and a concave image-side surface in a paraxial region, therefore moving the principal point towards the object side provides a favorable reduction in the back focal length of the optical imaging lens assembly in order to make the optical imaging lens assembly compact. Moreover, the arrangements of the curvature radius of the object-side surface of the sixth lens element and the curvature radius of the image-side surface of the sixth lens element can balance between the total track length and aberration corrections of the optical imaging lens assembly.

According to the optical imaging lens assembly of the present disclosure, the lens elements can be made of plastic or glass material. When the lens elements are made of glass material, the distribution of the refractive power of the optical imaging lens assembly can be more flexible to design. When the lens elements are made of plastic material, the manufacturing cost thereof can be reduced. Furthermore, surfaces of each lens element can be aspheric, so as to have more controllable variables for eliminating the aberrations thereof, and to further decrease the required number of the lens elements. Thus, the total track length of the optical imaging lens assembly can be effectively reduced.

According to the optical imaging lens assembly of the present disclosure, when the lens element has a convex surface, it indicates that the surface is convex in the paraxial region thereof; and when the lens element has a concave surface, it indicates that the surface is concave in the paraxial region thereof. Particularly, the paraxial region thereof refers to the region of the surface where light rays travel close to an optical axis and an off-axis region thereof refers to the region of the surface where light rays travel away from the optical axis.

According to the optical imaging lens assembly of the present disclosure, the optical imaging lens assembly can include at least one stop, such as an aperture stop, a glare stop or a field stop. Said glare stop or said field stop can be disposed in front of the first lens element, between lens elements or after the last lens element for eliminating the stray light and thereby improving the image resolution thereof.

According to the optical imaging lens assembly of the present disclosure, an aperture stop can be configured as a front stop or a middle stop. A front stop disposed between an imaged object and the first lens element can provide a longer distance between an exit pupil of the system and an image plane to enable a telecentric effect favorable for improving the image-sensing efficiency of the image sensor. A middle stop disposed between the first lens element and the image plane is favorable for enlarging the field of view of the optical imaging lens assembly and thereby provides a wider field of view for the same.

According to the optical imaging lens assembly of the present disclosure, the optical imaging lens assembly is featured with good aberration correction ability and high image quality, and can be applied to 3D (three-dimensional) image capturing applications, in products such as digital cameras, mobile devices and tablets.

According to the above description of the present disclosure, the following 1st-9th specific embodiments are provided for further explanation.

1st Embodiment

Figure 2:
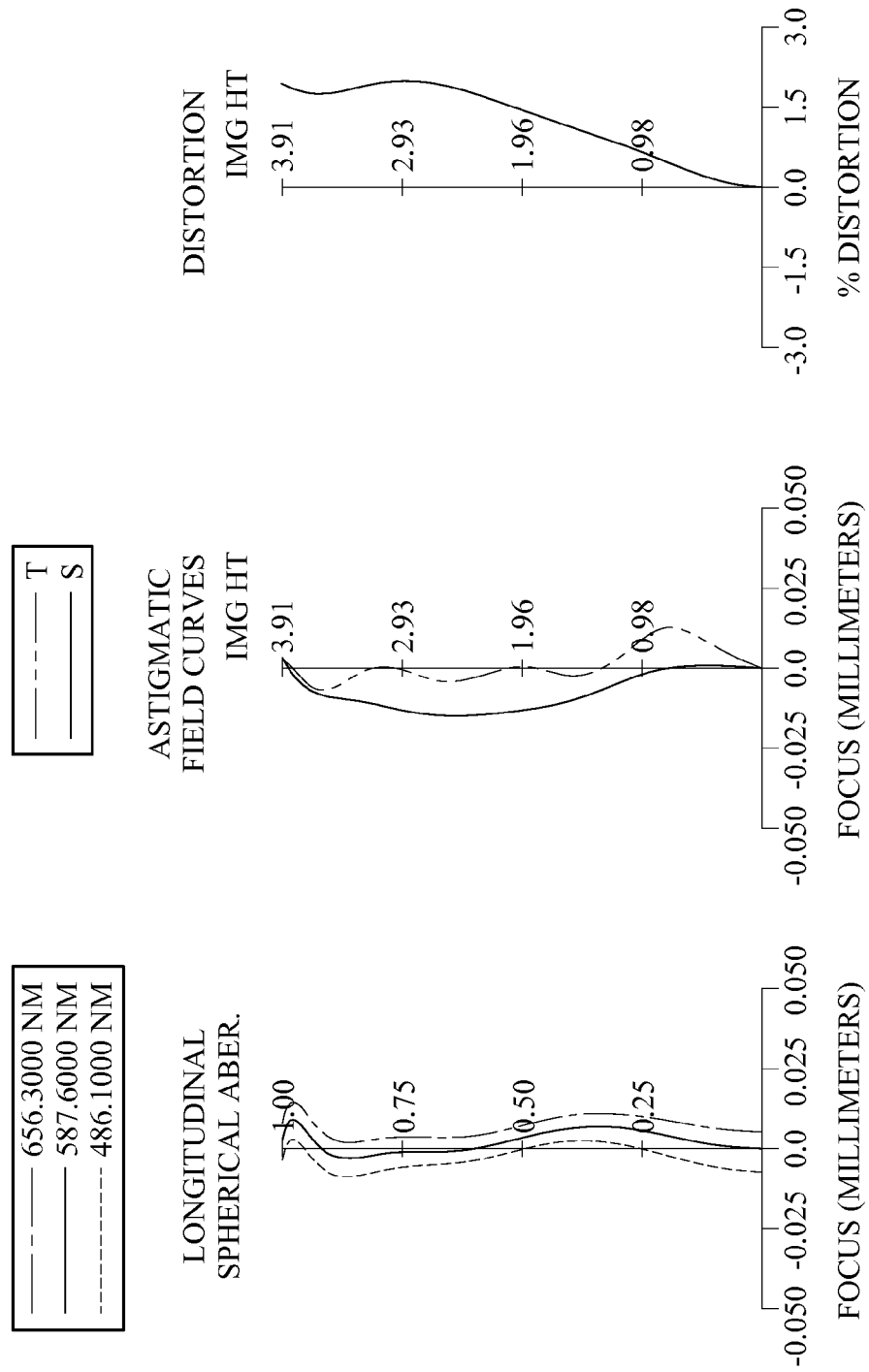
FIG. 2 shows spherical aberration curves, astigmatic field curves and a distortion curve of the optical imaging lens assembly according to the 1st embodiment.

FIG. 1 is a schematic view of an optical imaging lens assembly according to the 1st embodiment of the present disclosure. FIG. 2 shows spherical aberration curves, astigmatic field curves and a distortion curve of the optical imaging lens assembly according to the 1st embodiment. In FIG. 1, the optical imaging lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170, an image plane 180 and an image sensor 190, wherein the image sensor 190 is located on the image plane 180 of the optical imaging lens assembly, and the optical imaging lens assembly has a total of six lens elements (110-160) with refractive power.

The first lens element 110 with positive refractive power has a convex object-side surface 111 in a paraxial region thereof and a concave image-side surface 112 in a paraxial region thereof. The first lens element 110 is made of plastic material and the object-side surface 111 and the image-side surface 112 thereof are aspheric.

The second lens element 120 with negative refractive power has a convex object-side surface 121 in a paraxial region thereof and a concave image-side surface 122 in a paraxial region thereof. The second lens element 120 is made of plastic material and the object-side surface 121 and the image-side surface 122 thereof are aspheric.

The third lens element 130 with positive refractive power has a concave object-side surface 131 in a paraxial region thereof and a convex image-side surface 132 in a paraxial region thereof. The third lens element 130 is made of plastic material and the object-side surface 131 and the image-side surface 132 thereof are aspheric.

The fourth lens element 140 with negative refractive power has a concave object-side surface 141 in a paraxial region thereof and a convex image-side surface 142 in a paraxial region thereof. The fourth lens element 140 is made of plastic material and the object-side surface 141 and the image-side surface 142 thereof are aspheric.

The fifth lens element 150 with positive refractive power has a convex object-side surface 151 in a paraxial region thereof and a convex image-side surface 152 in a paraxial region thereof. The fifth lens element 150 is made of plastic material and the object-side surface 151 and the image-side surface 152 thereof are aspheric.

The sixth lens element 160 with negative refractive power has a concave object-side surface 161 in a paraxial region, a concave image-side surface 162 in a paraxial region and at least one convex shape in the off-axial region of the image-side surface 162 of the sixth lens element 160. The sixth lens element 160 is made of plastic material and the object-side surface 161 and the image-side surface 162 thereof are aspheric.

The IR-cut filter 170 is made of glass material, wherein the IR-cut filter 170 is located between the sixth lens element 160 and the image plane 180, and will not affect the focal length of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical imaging lens assembly according to the 1st embodiment, when a focal length of the optical imaging lens assembly is f, an f-number of the optical imaging lens assembly is Fno, and half of the maximal field of view of the optical imaging lens assembly is HFOV, these parameters have the following values: f=5.00 mm; Fno=2.03; and HFOV=37.5 degrees.

In the optical imaging lens assembly according to the 1st embodiment, when a refractive index of the first lens element 110 is N1, the following relationship is satisfied: N1=1.544.

In the optical imaging lens assembly according to the 1st embodiment, when an Abbe number of the second lens element 120 is V2, the following relationship is satisfied: V2=23.3.

In the optical imaging lens assembly according to the 1st embodiment, when an Abbe number of the first lens element 110 is V1, the Abbe number of the second lens element 120 is V2, and an Abbe number of the fourth lens element 140 is V4, the following relationship is satisfied: V1−(V2+V4)=9.3.

When a central thickness of the fifth lens element 150 is CT5, and a central thickness of the sixth lens element 160 is CT6, the following relationship is satisfied: CT5/CT6=2.02.

When a curvature radius of the object-side surface 141 of the fourth lens element 140 is R7, and the focal length of the optical imaging lens assembly is f, the following relationship is satisfied: R7/f=−0.38.

When a curvature radius of the image-side surface 142 of the fourth lens element 140 is R8, and the focal length of the optical imaging lens assembly is f, the following relationship is satisfied: R8/f=−0.59.

When a curvature radius of the image-side surface 152 of the fifth lens element 150 is R10, and the focal length of the optical imaging lens assembly is f, the following relationship is satisfied: R10/f=−0.49.

When a curvature radius of an object-side surface 161 of the sixth lens element 160 is R11, and a curvature radius of the image-side surface 162 of the sixth lens element 160 is R12, the following relationship is satisfied: (R11+R12)/(R11−R12)=−0.32.

When a focal length of the fifth lens element 150 is f5, and a focal length of the sixth lens element 160 is f6, the following relationship is satisfied: f5/f6=−1.12.

When the focal length of the optical imaging lens assembly is f, and the focal length of the sixth lens element 160 is f6, the following relationship is satisfied: f/f6=−1.81.

When a distance in parallel with the optical axis from an axial vertex on the object-side surface 161 of the sixth lens element 160 to a maximum effective semi-diameter position on the object-side surface 161 of the sixth lens element 160 is SAG61, and an axial distance between the fifth lens element 150 and the sixth lens element 160 is T56, the following relationship is satisfied: SAG61/T56=−1.58.

When a vertical distance from the optical axis to a critical point on the image-side surface 162 of the sixth lens element 160 is Yc62, and the focal length of the optical imaging lens assembly is f, the following relationship is satisfied: Yc62/f=0.35.

When an axial distance between the stop 100 and the image-side surface 162 of the sixth lens element 160 is SD, and an axial distance between the object-side surface 111 of the first lens element 110 and the image-side surface 162 of the sixth lens element 160 is TD, the following relationship is satisfied: SD/TD=0.93.

When a half of a diagonal length of an effective photosensitive area on the image sensor 190 is ImgH, and an axial distance from the object-side surface 111 of the first lens element 110 to the image plane 180 is TTL, the following relationship is satisfied: TTL/ImgH=1.59.

The detailed optical data of the 1st embodiment are shown in Table 1 and the aspheric surface data are shown in Table 2 below.

TABLE 1

1st Embodiment
f = 5.00 mm, Fno = 2.03, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.372 | | | | |
| 2 | Lens 1 | 2.101 | ASP | 0.731 | Plastic | 1.544 | 55.9 | 4.11 |
| 3 | | 30.457 | ASP | 0.078 | | | | |
| 4 | Lens 2 | 44.486 | ASP | 0.231 | Plastic | 1.640 | 23.3 | −9.41 |
| 5 | | 5.294 | ASP | 0.528 | | | | |
| 6 | Lens 3 | −28.307 | ASP | 0.900 | Plastic | 1.544 | 55.9 | 19.72 |
| 7 | | −7.867 | ASP | 0.489 | | | | |
| 8 | Lens 4 | −1.900 | ASP | 0.270 | Plastic | 1.640 | 23.3 | −9.39 |
| 9 | | −2.932 | ASP | 0.035 | | | | |
| 10 | Lens 5 | 4.657 | ASP | 0.811 | Plastic | 1.544 | 55.9 | 3.09 |
| 11 | | −2.472 | ASP | 0.678 | | | | |
| 12 | Lens 6 | −2.321 | ASP | 0.402 | Plastic | 1.544 | 55.9 | −2.76 |
| 13 | | 4.509 | ASP | 0.500 | | | | |
| 14 | IR-cut filter | Plano | | 0.300 | Glass | 1.517 | 64.2 | — |
| 15 | | Plano | | 0.352 | | | | |
| 16 | Image | Plano | | — | | | | |

Note:
Reference wavelength is 587.6 nm (d-line).

TABLE 2

Aspheric Coefficients

| | Surface # | | | |
|---|---|---|---|---|
| | 2 | 3 | 4 | 5 |
| k = | 2.5779E−01 | −1.0000E+00 | 3.4381E+01 | −2.5736E+01 |
| A4 = | 2.2459E−03 | −4.8538E−02 | −1.0551E−01 | −4.5101E−02 |
| A6 = | −2.0452E−03 | 5.4316E−02 | 1.3912E−01 | 8.5513E−02 |
| A8 = | 1.0162E−02 | −1.0241E−02 | −7.4895E−02 | −5.0072E−02 |
| A10 = | −1.4537E−02 | −2.7731E−02 | 8.7794E−04 | 1.1554E−02 |
| A12 = | 1.0220E−02 | 2.3082E−02 | 1.9197E−02 | 4.3069E−03 |
| A14 = | −2.9300E−03 | −6.2508E−03 | −6.2225E−03 | −3.8226E−04 |

| | Surface # | | | |
|---|---|---|---|---|
| | 6 | 7 | 8 | 9 |
| k = | −1.0000E+00 | −1.0004E+00 | −3.7924E+00 | −2.0376E−01 |
| A4 = | −6.0335E−02 | −3.1065E−02 | 1.4155E−01 | 8.1796E−02 |
| A6 = | −8.3160E−03 | −1.8047E−02 | −1.8442E−01 | −6.4062E−02 |
| A8 = | −1.0175E−03 | 2.1933E−03 | 1.2359E−01 | 3.3388E−02 |
| A10 = | 5.1926E−03 | 7.1165E−04 | −5.9401E−02 | −1.4873E−02 |
| A12 = | −9.8834E−03 | −3.9624E−04 | 1.6688E−02 | 3.8332E−03 |
| A14 = | 4.5185E−03 | 1.5021E−04 | −1.8921E−03 | −3.6395E−04 |

| | Surface # | | | |
|---|---|---|---|---|
| | 10 | 11 | 12 | 13 |
| k = | −4.2168E+01 | −4.5412E+00 | −3.7804E+00 | −2.1150E+00 |
| A4 = | −7.5583E−02 | −3.0976E−02 | −2.9198E−02 | −3.0744E−02 |
| A6 = | 4.2286E−02 | 1.5882E−03 | 7.2850E−03 | 5.2855E−03 |
| A8 = | −1.4343E−02 | 8.4103E−03 | −7.5013E−04 | −7.3914E−04 |
| A10 = | 2.0688E−03 | −3.3817E−03 | 2.0121E−05 | 6.4427E−05 |
| A12 = | −1.0669E−04 | 5.2187E−04 | 5.5390E−06 | −3.6881E−06 |
| A14 = | 1.3640E−06 | −2.9925E−05 | −4.7471E−07 | 1.0755E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. This information related to Table 1 and Table 2 applies also to the Tables for the remaining embodiments, and so an explanation in this regard will not be provided again.

2nd Embodiment

Figure 3:
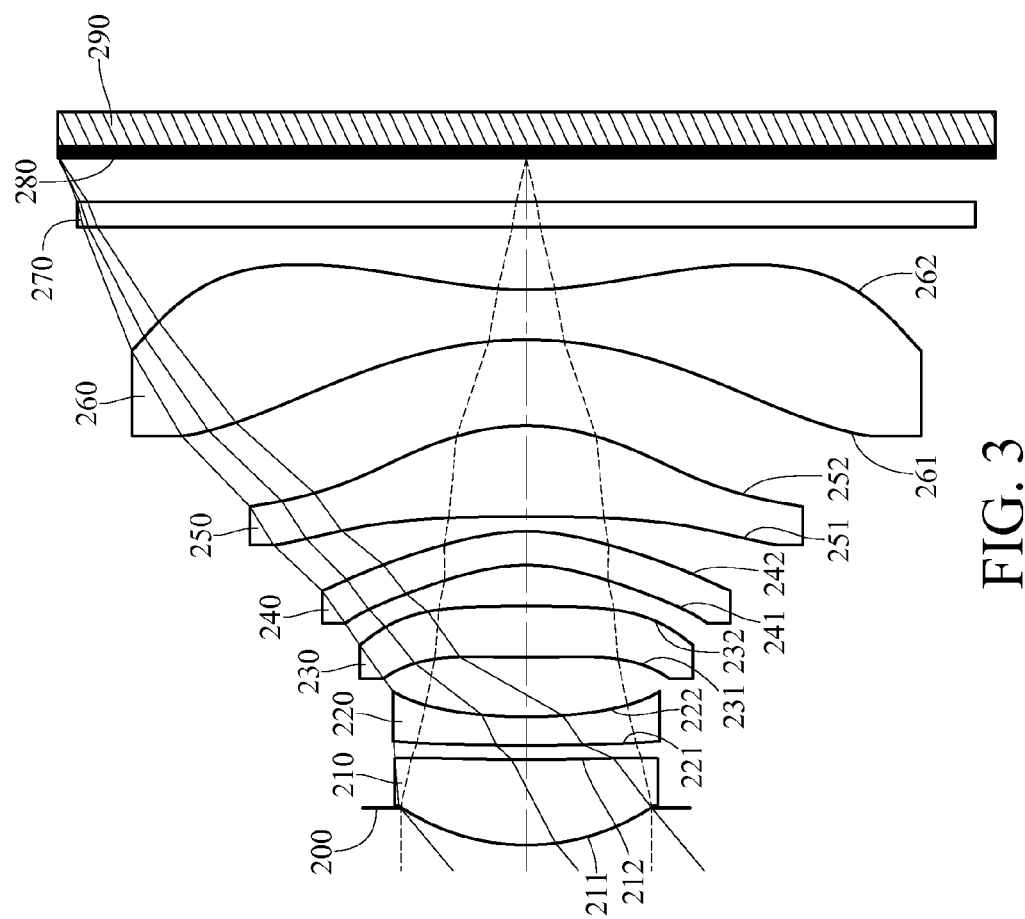
FIG. 3 is a schematic view of an optical imaging lens assembly according to the 2nd embodiment of the present disclosure.
Figure 4:
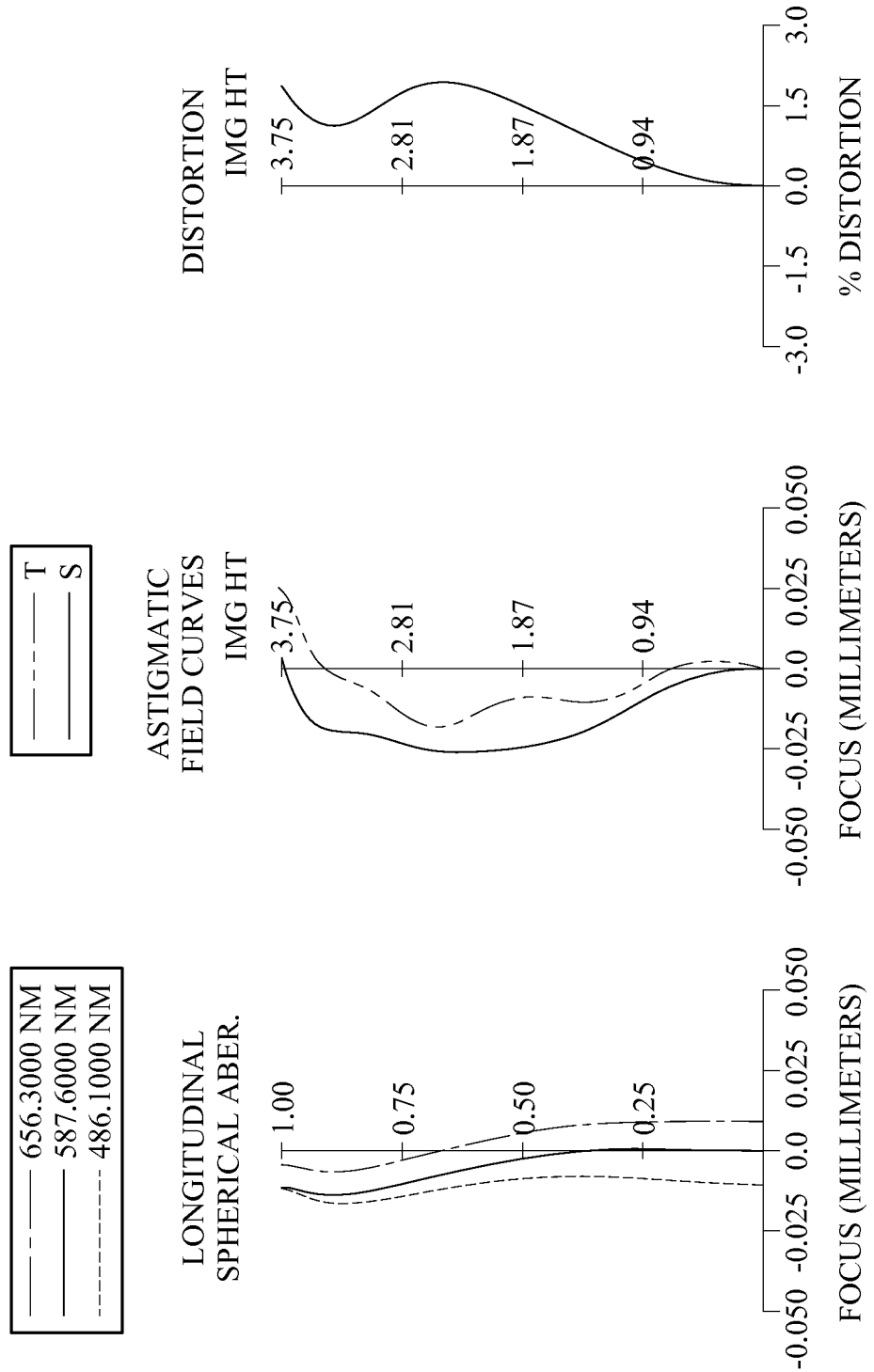
FIG. 4 shows spherical aberration curves, astigmatic field curves and a distortion curve of the optical imaging lens assembly according to the 2nd embodiment.

FIG. 3 is a schematic view of an optical imaging lens assembly according to the 2nd embodiment of the present disclosure. FIG. 4 shows spherical aberration curves, astigmatic field curves and a distortion curve of the optical imaging lens assembly according to the 2nd embodiment. In FIG. 3, an optical imaging lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270, an image plane 280 and an image sensor 290, wherein the image sensor 290 is located on the image plane 280, and the optical imaging lens assembly has a total of six lens elements (210-260) with refractive power.

The first lens element 210 with positive refractive power has a convex object-side surface 211 in a paraxial region and a concave image-side surface 212 in a paraxial region. The first lens element 210 is made of plastic material and the object-side surface 211 and the image-side surface 212 thereof are aspheric.

The second lens element 220 with negative refractive power has a convex object-side surface 221 in a paraxial region and a concave image-side surface 222 in a paraxial region. The second lens element 220 is made of plastic material and the object-side surface 221 and the image-side surface 222 thereof are aspheric.

The third lens element 230 with positive refractive power has a convex object-side surface 231 in a paraxial region and a convex image-side surface 232 in a paraxial region. The third lens element 230 is made of plastic material and the object-side surface 231 and the image-side surface 232 thereof are aspheric.

The fourth lens element 240 with negative refractive power has a concave object-side surface 241 in a paraxial region and a convex image-side surface 242 in a paraxial region. The fourth lens element 240 is made of plastic material and the object-side surface 241 and the image-side surface 242 thereof are aspheric.

The fifth lens element 250 with positive refractive power has a concave object-side surface 251 in a paraxial region and a convex image-side surface 252 in a paraxial region. The fifth lens element 250 is made of plastic material and the object-side surface 251 and the image-side surface 252 thereof are aspheric.

The sixth lens element 260 with negative refractive power has a concave object-side surface 261 in a paraxial region, a concave image-side surface 262 in a paraxial region and at least one convex shape in an off-axial region of the image-side surface 262 of the sixth lens element 260. The sixth lens element 260 is made of plastic material and the object-side surface 261 and the image-side surface 262 thereof are aspheric.

The IR-cut filter 270 is made of glass material, wherein the IR-cut filter 270 is located between the sixth lens element 260 and the image plane 280, and will not affect the focal length of the optical imaging lens assembly.

The detailed optical data of the 2nd embodiment are shown in Table 3 and the aspheric surface data are shown in Table 4 below.

TABLE 3

2nd Embodiment
f = 4.42 mm, Fno = 2.20, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.296 | | | | |
| 2 | Lens 1 | 1.828 | ASP | 0.682 | Plastic | 1.544 | 55.9 | 3.92 |
| 3 | | 11.042 | ASP | 0.114 | | | | |
| 4 | Lens 2 | 9.432 | ASP | 0.230 | Plastic | 1.650 | 21.4 | −8.53 |
| 5 | | 3.458 | ASP | 0.479 | | | | |
| 6 | Lens 3 | 14.623 | ASP | 0.408 | Plastic | 1.544 | 55.9 | 15.35 |
| 7 | | −19.290 | ASP | 0.330 | | | | |
| 8 | Lens 4 | −1.441 | ASP | 0.270 | Plastic | 1.650 | 21.4 | −19.97 |
| 9 | | −1.741 | ASP | 0.118 | | | | |
| 10 | Lens 5 | −100.000 | ASP | 0.729 | Plastic | 1.544 | 55.9 | 3.37 |
| 11 | | −1.807 | ASP | 0.690 | | | | |
| 12 | Lens 6 | −2.951 | ASP | 0.400 | Plastic | 1.535 | 55.7 | −2.80 |
| 13 | | 3.178 | ASP | 0.500 | | | | |
| 14 | IR-cut filter | Plano | | 0.200 | Glass | 1.517 | 64.2 | — |
| 15 | | Plano | | 0.355 | | | | |
| 16 | Image | Plano | | — | | | | |

Note:
Reference wavelength is 587.6 nm (d-line).

TABLE 4

Aspheric Coefficients

| | Surface # | | | |
|---|---|---|---|---|
| | 2 | 3 | 4 | 5 |
| k = | 2.0952E−01 | −1.0000E+00 | −2.9364E+01 | −1.4072E+01 |
| A4 = | −1.9740E−04 | −5.2544E−02 | −1.0477E−01 | −2.4055E−02 |
| A6 = | −4.4258E−03 | 5.3292E−02 | 1.6410E−01 | 1.1529E−01 |
| A8 = | 1.0538E−02 | −1.2911E−02 | −9.2031E−02 | −6.0798E−02 |
| A10 = | −1.8430E−02 | −3.8430E−02 | −1.4619E−04 | 1.2681E−02 |

TABLE 4-continued

| Aspheric Coefficients | | | | |
|---|---|---|---|---|
| A12 = | 1.5083E−02 | 3.3893E−02 | 2.0764E−02 | 5.5946E−03 |
| A14 = | −6.2791E−03 | −1.1957E−02 | −7.0347E−03 | 8.0573E−04 |

| | Surface # | | | |
|---|---|---|---|---|
| | 6 | 7 | 8 | 9 |
| k = | −1.0000E+00 | −1.0000E+00 | −9.7575E−01 | −8.9313E−01 |
| A4 = | −9.9330E−02 | −4.4202E−02 | 1.9692E−01 | 1.1867E−01 |
| A6 = | −2.1195E−02 | −4.6642E−02 | −1.8048E−01 | −7.2024E−02 |
| A8 = | −9.3678E−03 | 1.4686E−02 | 1.4345E−01 | 4.3460E−02 |
| A10 = | 1.2324E−02 | −8.8214E−05 | −7.7632E−02 | −2.0276E−02 |
| A12 = | −1.1956E−02 | −1.9897E−03 | 2.3447E−02 | 4.9303E−03 |
| A14 = | 6.6005E−03 | 9.5521E−04 | −3.1130E−03 | −4.2118E−04 |

| | Surface # | | | |
|---|---|---|---|---|
| | 10 | 11 | 12 | 13 |
| k = | −1.0000E+00 | −2.8777E+00 | −1.3972E+01 | −3.9075E+00 |
| A4 = | −6.2168E−02 | −2.3900E−02 | −3.1933E−02 | −3.5750E−02 |
| A6 = | 4.4489E−02 | 6.5326E−03 | 8.5086E−03 | 6.9777E−03 |
| A8 = | −1.8013E−02 | 9.2776E−03 | −9.2289E−04 | −1.0414E−03 |
| A10 = | 3.1804E−03 | −4.4931E−03 | 1.5571E−05 | 9.5028E−05 |
| A12 = | −1.0013E−04 | 7.6136E−04 | 5.8806E−06 | −6.2342E−06 |
| A14 = | −1.7816E−05 | −4.6005E−05 | −3.6988E−07 | 2.1886E−07 |

In the optical imaging lens assembly according to the 2nd embodiment, the definitions of these parameters shown in the following table are the same as those stated in the 1st embodiment with corresponding values for the 2nd embodiment.

| 2nd Embodiment | | | |
|---|---|---|---|
| f [mm] | 4.42 | R10/f | −0.41 |
| Fno | 2.20 | (R11 + R12)/(R11 − R12) | −0.04 |
| HFOV [deg.] | 39.8 | f5/f6 | −1.21 |
| N1 | 1.544 | f/f6 | −1.58 |
| V2 | 21.4 | SAG61/T56 | −1.12 |
| V1 − (V2 + V4) | 13.1 | Yc62/f | 0.41 |
| CT5/CT6 | 1.82 | SD/TD | 0.93 |
| R7/f | −0.33 | TTL/ImgH | 1.45 |
| R8/f | −0.39 | | |

3rd Embodiment

Figure 5:
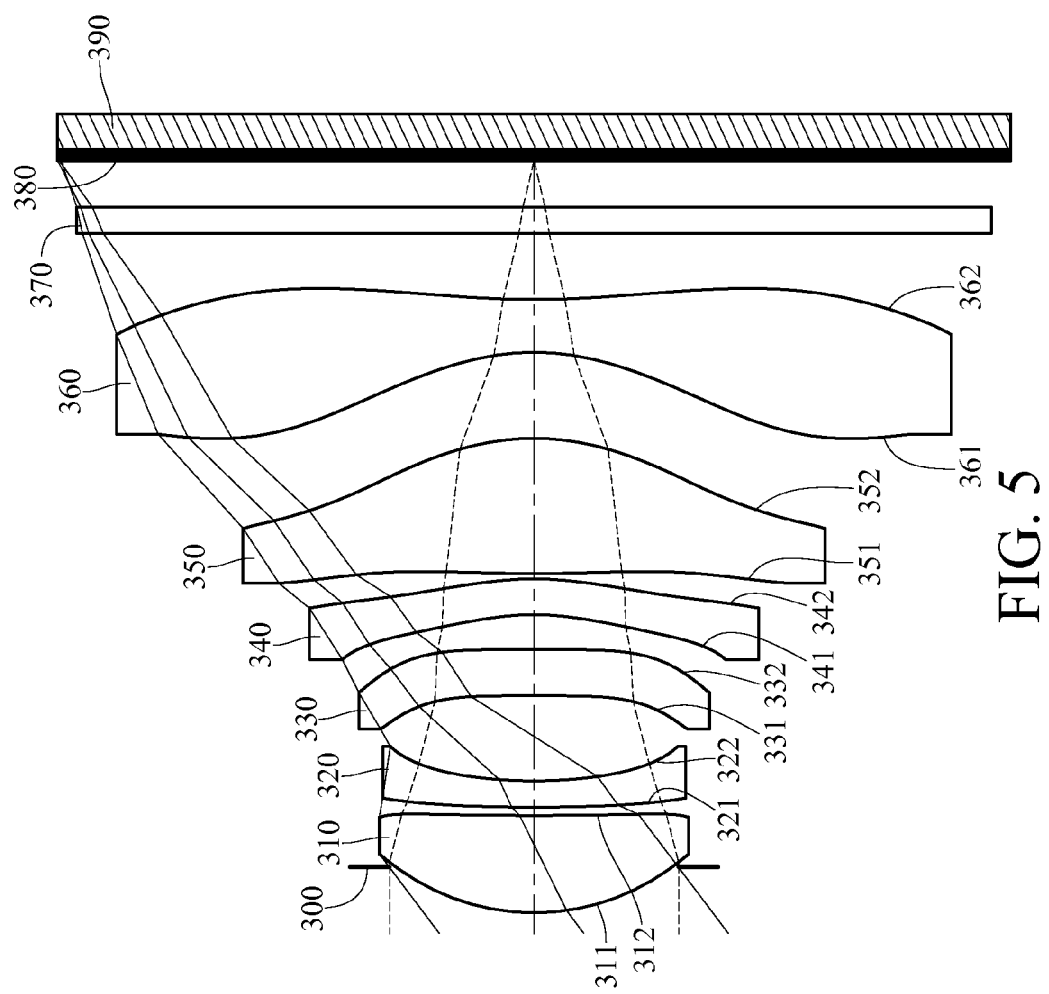
FIG. 5 is a schematic view of an optical imaging lens assembly according to the 3rd embodiment of the present disclosure.
Figure 6:
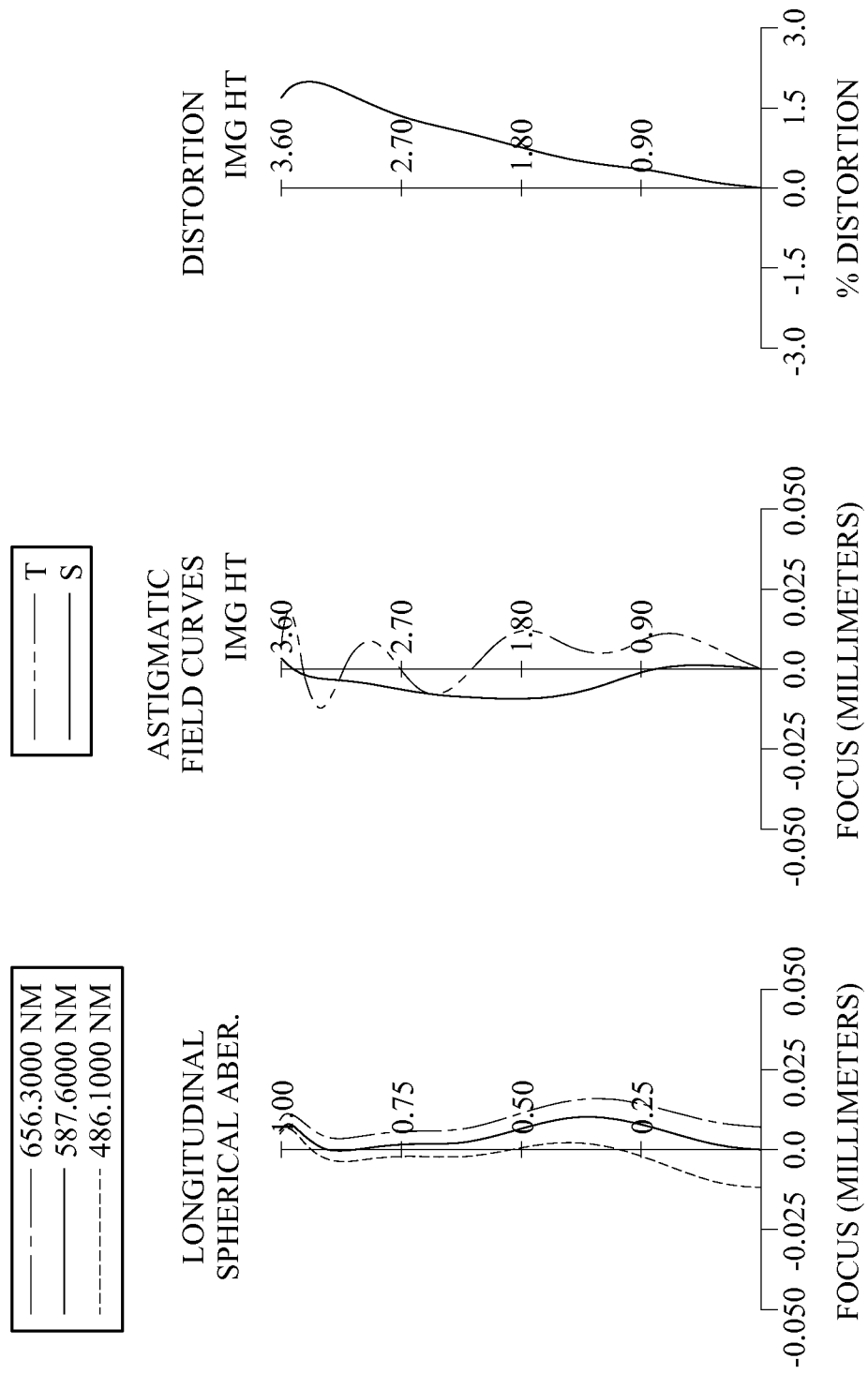
FIG. 6 shows spherical aberration curves, astigmatic field curves and a distortion curve of the optical imaging lens assembly according to the 3rd embodiment.

FIG. 5 is a schematic view of an optical imaging lens assembly according to the 3rd embodiment of the present disclosure. FIG. 6 shows spherical aberration curves, astigmatic field curves and a distortion curve of the optical imaging lens assembly according to the 3rd embodiment. In FIG. 5, an optical imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370, an image plane 380 and an image sensor 390, wherein the image sensor 390 is located on the image plane 380, and the optical imaging lens assembly has a total of six lens elements (310-360) with refractive power.

The first lens element 310 with positive refractive power has a convex object-side surface 311 in a paraxial region and a concave image-side surface 312 in a paraxial region. The first lens element 310 is made of plastic material and the object-side surface 311 and the image-side surface 312 thereof are aspheric.

The second lens element 320 with negative refractive power has a convex object-side surface 321 in a paraxial region and a concave image-side surface 322 in a paraxial region. The second lens element 320 is made of plastic material and the object-side surface 321 and the image-side surface 322 thereof are aspheric.

The third lens element 330 with negative refractive power has a convex object-side surface 331 in a paraxial region and a concave image-side surface 332 in a paraxial region. The third lens element 330 is made of plastic material and the object-side surface 331 and the image-side surface 332 thereof are aspheric.

The fourth lens element 340 with negative refractive power has a concave object-side surface 341 in a paraxial region and a convex image-side surface 342 in a paraxial region. The fourth lens element 340 is made of plastic material and the object-side surface 341 and the image-side surface 342 thereof are aspheric.

The fifth lens element 350 with positive refractive power has a convex object-side surface 351 in a paraxial region and a convex image-side surface 352 in a paraxial region. The fifth lens element 350 is made of plastic material and the object-side surface 351 and the image-side surface 352 thereof are aspheric.

The sixth lens element 360 with negative refractive power has a concave object-side surface 361 in a paraxial region, a concave image-side surface 362 in a paraxial region and at least one convex shape in an off-axial region of the image-side surface 362 of the sixth lens element 360. The sixth lens element 360 is made of plastic material and the object-side surface 361 and the image-side surface 362 thereof are aspheric.

The IR-cut filter 370 is made of glass material, wherein the IR-cut filter 370 is located between the sixth lens element 360 and the image plane 380, and will not affect the focal length of the optical imaging lens assembly.

The detailed optical data of the 3rd embodiment are shown in Table 5 and the aspheric surface data are shown in Table 6 below.

TABLE 5

3rd Embodiment
f = 4.70 mm, Fno = 2.15, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.343 | | | | |
| 2 | Lens 1 | 1.769 | ASP | 0.736 | Plastic | 1.544 | 55.9 | 3.54 |
| 3 | | 18.606 | ASP | 0.061 | | | | |
| 4 | Lens 2 | 8.797 | ASP | 0.200 | Plastic | 1.640 | 23.3 | −8.22 |
| 5 | | 3.262 | ASP | 0.645 | | | | |
| 6 | Lens 3 | 555.177 | ASP | 0.349 | Plastic | 1.640 | 23.3 | −82.91 |
| 7 | | 48.407 | ASP | 0.265 | | | | |
| 8 | Lens 4 | −1.944 | ASP | 0.270 | Plastic | 1.640 | 23.3 | −15.86 |
| 9 | | −2.535 | ASP | 0.040 | | | | |
| 10 | Lens 5 | 8.644 | ASP | 1.024 | Plastic | 1.544 | 55.9 | 2.97 |
| 11 | | −1.904 | ASP | 0.651 | | | | |
| 12 | Lens 6 | −1.884 | ASP | 0.400 | Plastic | 1.535 | 55.7 | −2.69 |
| 13 | | 6.559 | ASP | 0.500 | | | | |
| 14 | IR-cut filter | Plano | | 0.200 | Glass | 1.517 | 64.2 | — |
| 15 | | Plano | | 0.349 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 |
|---|---|---|---|---|
| k = | 2.2474E−01 | −1.0000E+00 | −3.0000E+01 | −5.6111E+00 |
| A4 = | −7.1456E−04 | −4.8727E−02 | −8.8131E−02 | −2.2656E−02 |
| A6 = | 1.4915E−04 | 6.7362E−02 | 1.6421E−01 | 1.0890E−01 |
| A8 = | 4.0570E−03 | −1.4150E−02 | −9.4452E−02 | −5.5332E−02 |
| A10 = | −1.7592E−02 | −4.3551E−02 | 2.1681E−03 | 1.5002E−02 |
| A12 = | 1.9675E−02 | 3.3090E−02 | 2.1906E−02 | 5.7736E−03 |
| A14 = | −8.3635E−03 | −1.0150E−02 | −8.6166E−03 | 3.0257E−03 |

| Surface # | 6 | 7 | 8 | 9 |
|---|---|---|---|---|
| k = | −1.0000E+00 | −1.0000E+00 | −1.0871E+00 | −1.1198E+00 |
| A4 = | −1.3685E−01 | −9.4372E−02 | 1.9990E−01 | 1.1115E−01 |
| A6 = | −1.5260E−03 | −2.7784E−02 | −1.8853E−01 | −6.6330E−02 |
| A8 = | −1.1234E−02 | 1.4746E−02 | 1.4272E−01 | 4.3891E−02 |
| A10 = | 5.6229E−03 | −4.2150E−03 | −7.6562E−02 | −2.0560E−02 |
| A12 = | −1.2120E−02 | −2.9557E−03 | 2.3202E−02 | 4.8650E−03 |
| A14 = | 1.0340E−02 | 2.2471E−03 | −3.2216E−03 | −4.3704E−04 |

| Surface # | 10 | 11 | 12 | 13 |
|---|---|---|---|---|
| k = | −1.0000E+00 | −3.5141E+00 | −3.0583E+00 | −6.3232E+00 |
| A4 = | −7.4083E−02 | −3.1309E−02 | −9.8918E−03 | −2.2745E−02 |
| A6 = | 4.3367E−02 | 5.7670E−03 | 8.1718E−03 | 4.8494E−03 |
| A8 = | −1.7435E−02 | 9.5278E−03 | −1.0020E−03 | −9.4339E−04 |
| A10 = | 3.3556E−03 | −4.4570E−03 | 9.7938E−06 | 1.0738E−04 |
| A12 = | −1.0226E−04 | 7.6046E−04 | 5.7088E−06 | −5.9247E−06 |
| A14 = | −2.8032E−05 | −4.7332E−05 | −2.9919E−07 | 1.1659E−07 |

In the optical imaging lens assembly according to the 3rd embodiment, the definitions of these parameters shown in the following table are the same as those stated in the 1st embodiment with corresponding values for the 3rd embodiment.

| 3rd Embodiment | | | |
|---|---|---|---|
| f [mm] | 4.70 | R10/f | −0.41 |
| Fno | 2.15 | (R11 + R12)/(R11 − R12) | −0.55 |
| HFOV [deg.] | 37.0 | f5/f6 | −1.10 |
| N1 | 1.544 | f/f6 | −1.75 |
| V2 | 23.3 | SAG61/T56 | −0.95 |
| V1 − (V2 + V4) | 9.3 | Yc62/f | 0.35 |
| CT5/CT6 | 2.56 | SD/TD | 0.93 |
| R7/f | −0.41 | TTL/ImgH | 1.56 |
| R8/f | −0.54 | | |

4th Embodiment

Figure 7:
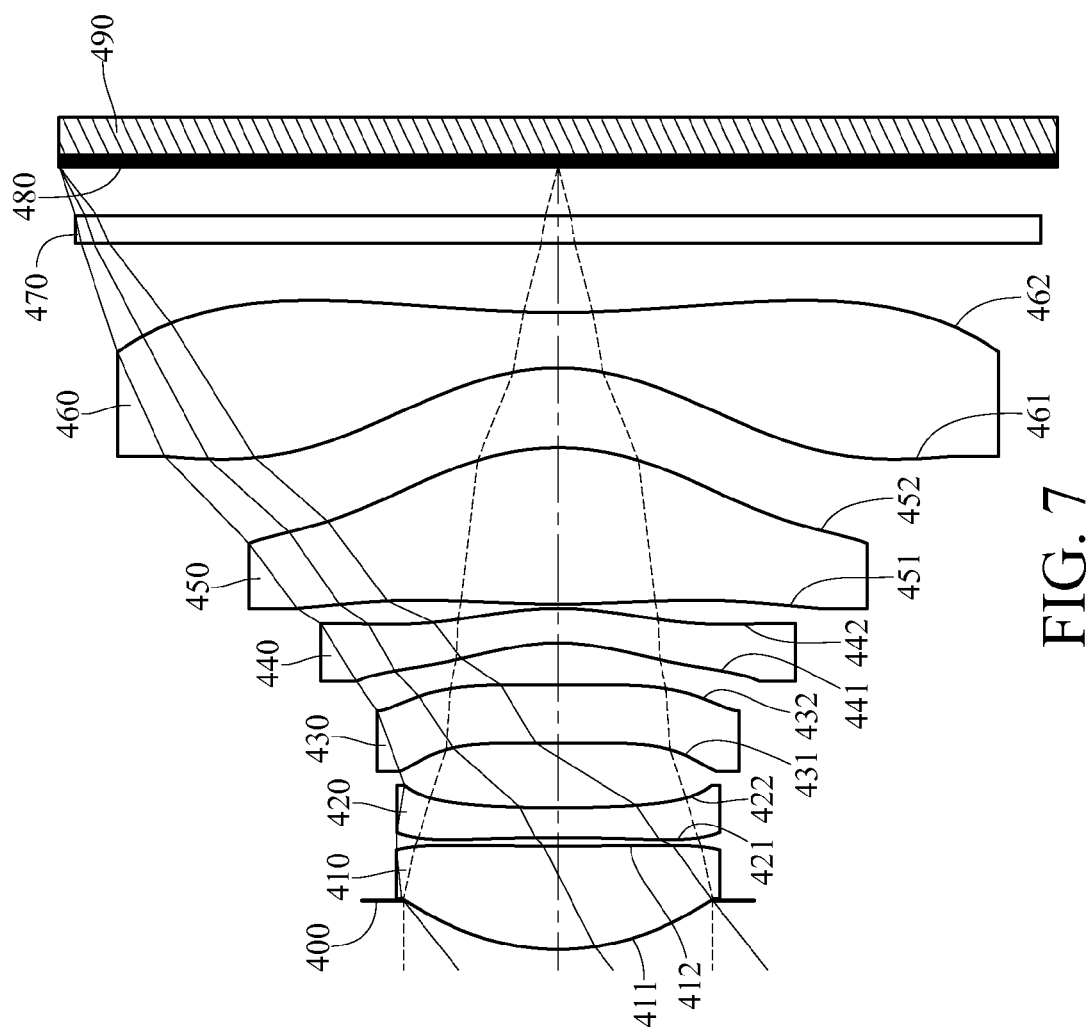
FIG. 7 is a schematic view of an optical imaging lens assembly according to the 4th embodiment of the present disclosure.
Figure 8:
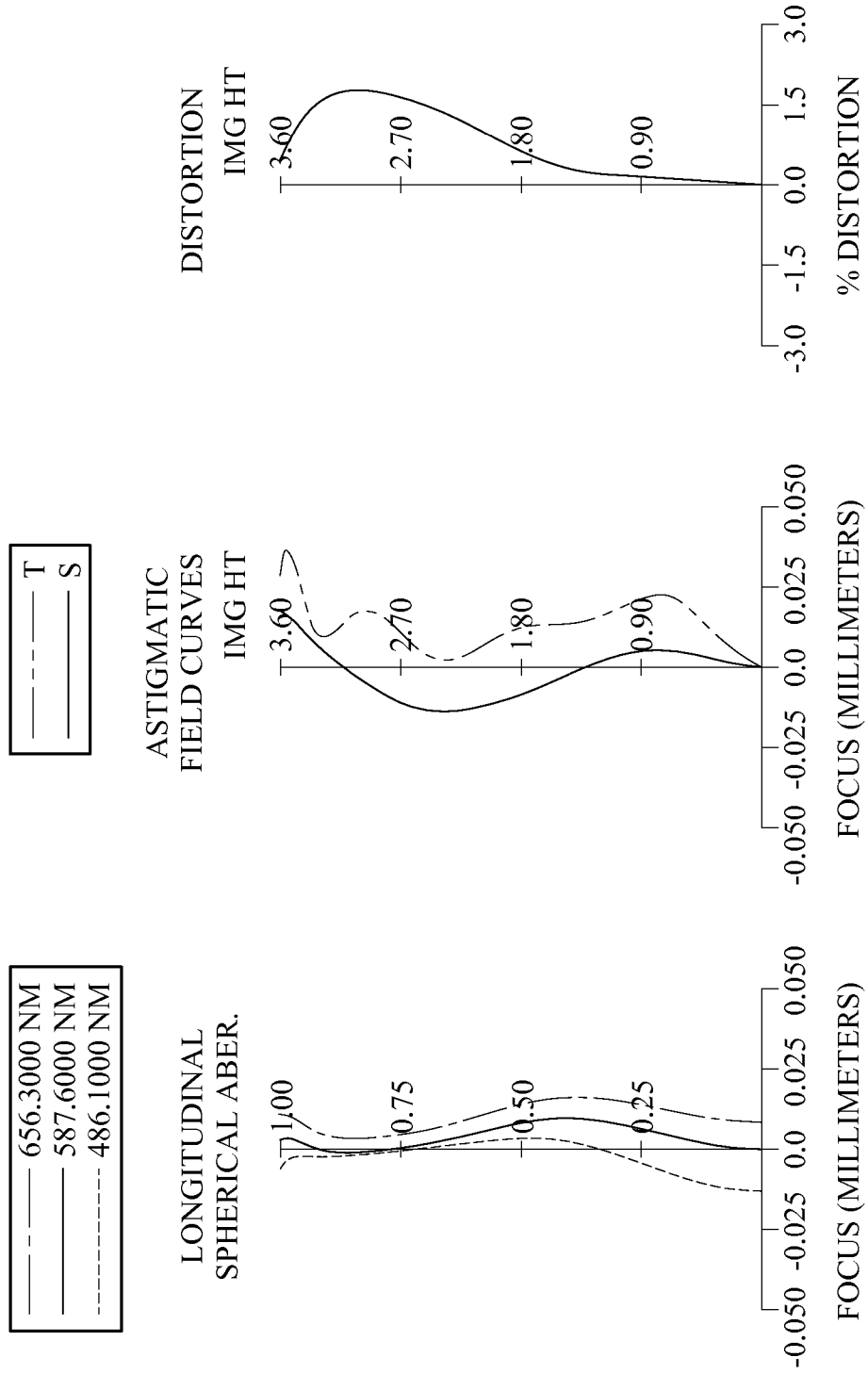
FIG. 8 shows spherical aberration curves, astigmatic field curves and a distortion curve of the optical imaging lens assembly according to the 4th embodiment.

FIG. 7 is a schematic view of an optical imaging lens assembly according to the 4th embodiment of the present disclosure. FIG. 8 shows spherical aberration curves, astigmatic field curves and a distortion curve of the optical imaging lens assembly according to the 4th embodiment. In FIG. 7, an optical imaging lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470, an image plane 480 and an image sensor 490, wherein the image sensor 490 is located on the image plane 480, and the optical imaging lens assembly has a total of six lens elements (410-460) with refractive power.

The first lens element 410 with positive refractive power has a convex object-side surface 411 in a paraxial region and a concave image-side surface 412 in a paraxial region. The first lens element 410 is made of plastic material and the object-side surface 411 and the image-side surface 412 thereof are aspheric.

The second lens element 420 with negative refractive power has a concave object-side surface 421 in a paraxial region and a concave image-side surface 422 in a paraxial region. The second lens element 420 is made of plastic material and the object-side surface 421 and the image-side surface 422 thereof are aspheric.

The third lens element 430 with positive refractive power has a convex object-side surface 431 in a paraxial region and a concave image-side surface 432 in a paraxial region. The third lens element 430 is made of plastic material and the object-side surface 431 and the image-side surface 432 thereof are aspheric.

The fourth lens element 440 with negative refractive power has a concave object-side surface 441 in a paraxial region and a convex image-side surface 442 in a paraxial region. The fourth lens element 440 is made of plastic material and the object-side surface 441 and the image-side surface 442 thereof are aspheric.

The fifth lens element 450 with positive refractive power has a convex object-side surface 451 in a paraxial region and a convex image-side surface 452 in a paraxial region. The fifth lens element 450 is made of plastic material and the object-side surface 451 and the image-side surface 452 thereof are aspheric.

The sixth lens element 460 with negative refractive power has a concave object-side surface 461 in a paraxial region, a concave image-side surface 462 in a paraxial region and at least one convex shape in an off-axial region of the image-side surface 462 of the sixth lens element 460. The sixth lens element 460 is made of plastic material and the object-side surface 461 and the image-side surface 462 thereof are aspheric.

The IR-cut filter 470 is made of glass material, wherein the IR-cut filter 470 is located between the sixth lens element 460 and the image plane 480, and will not affect the focal length of the optical imaging lens assembly.

The detailed optical data of the 4th embodiment are shown in Table 7 and the aspheric surface data are shown in Table 8 below.

TABLE 7

4th Embodiment
f = 4.51 mm, Fno = 2.02, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.352 | | | | |
| 2 | Lens 1 | 1.853 | ASP | 0.746 | Plastic | 1.572 | 55.2 | 3.60 |
| 3 | | 15.745 | ASP | 0.060 | | | | |
| 4 | Lens 2 | −19.407 | ASP | 0.215 | Plastic | 1.640 | 23.3 | −9.54 |
| 5 | | 8.941 | ASP | 0.468 | | | | |
| 6 | Lens 3 | 21.829 | ASP | 0.423 | Plastic | 1.640 | 23.3 | 45.52 |
| 7 | | 86.509 | ASP | 0.302 | | | | |
| 8 | Lens 4 | −1.542 | ASP | 0.250 | Plastic | 1.640 | 23.3 | −8.69 |
| 9 | | −2.269 | ASP | 0.030 | | | | |
| 10 | Lens 5 | 7.000 | ASP | 1.130 | Plastic | 1.572 | 55.2 | 2.64 |
| 11 | | −1.812 | ASP | 0.579 | | | | |
| 12 | Lens 6 | −1.632 | ASP | 0.400 | Plastic | 1.535 | 55.7 | −2.50 |
| 13 | | 8.075 | ASP | 0.500 | | | | |
| 14 | IR-cut filter | Plano | | 0.200 | Glass | 1.517 | 64.2 | — |
| 15 | | Plano | | 0.351 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 |
|---|---|---|---|---|
| k = | 2.1338E−01 | −1.0000E+00 | −2.2783E+01 | 4.4683E+00 |
| A4 = | −1.7058E−03 | −6.1351E−02 | −6.2574E−02 | −1.8317E−02 |

TABLE 8-continued

| Aspheric Coefficients | | | | |
|---|---|---|---|---|
| A6 = | −5.5709E−03 | 5.9396E−02 | 1.5609E−01 | 9.3995E−02 |
| A8 = | 9.7222E−03 | −8.3004E−03 | −1.0045E−01 | −6.0048E−02 |
| A10 = | −1.9682E−02 | −4.4229E−02 | 9.7504E−03 | 1.5484E−02 |
| A12 = | 1.5323E−02 | 3.0996E−02 | 2.9046E−02 | 3.5411E−03 |
| A14 = | −6.7607E−03 | −7.9932E−03 | −1.0377E−02 | 7.1008E−03 |
| Surface # | 6 | 7 | 8 | 9 |
| k = | −1.0000E+00 | −1.0000E+00 | −2.1264E+00 | −6.2760E+00 |
| A4 = | −1.2664E−01 | −7.7997E−02 | 2.1995E−01 | 1.1331E−01 |
| A6 = | −1.8897E−02 | −2.2737E−02 | −1.8219E−01 | −6.8791E−02 |
| A8 = | −1.2293E−02 | 1.6960E−02 | 1.3951E−01 | 4.4231E−02 |
| A10 = | 3.0394E−03 | −4.7022E−03 | −7.7541E−02 | −2.0502E−02 |
| A12 = | −1.0612E−02 | −3.5135E−03 | 2.3205E−02 | 4.8510E−03 |
| A14 = | 1.5373E−02 | 3.6075E−03 | −2.9427E−03 | −4.4455E−04 |
| Surface # | 10 | 11 | 12 | 13 |
| k = | −1.0000E+00 | −3.0064E+00 | −3.1195E+00 | −1.4377E+00 |
| A4 = | −7.0161E−02 | −1.9944E−02 | −3.2657E−03 | −1.6303E−02 |
| A6 = | 4.1094E−02 | 3.5999E−03 | 7.0950E−03 | 3.2525E−03 |
| A8 = | −1.7553E−02 | 9.5894E−03 | −1.0027E−03 | −7.2651E−04 |
| A10 = | 3.5266E−03 | −4.4407E−03 | 1.4883E−05 | 9.3892E−05 |
| A12 = | −8.1573E−05 | 7.5741E−04 | 6.0331E−06 | −6.3203E−06 |
| A14 = | −3.8794E−05 | −4.7118E−05 | −3.3714E−07 | 1.6907E−07 |

In the optical imaging lens assembly according to the 4th embodiment, the definitions of these parameters shown in the following table are the same as those stated in the 1st embodiment with corresponding values for the 4th embodiment.

| 4th Embodiment | | | |
|---|---|---|---|
| f [mm] | 4.51 | R10/f | −0.40 |
| Fno | 2.02 | (R11 + R12)/(R11 − R12) | −0.66 |
| HFOV [deg.] | 38.5 | f5/f6 | −1.05 |
| N1 | 1.572 | f/f6 | −1.80 |
| V2 | 23.3 | SAG61/T56 | −1.11 |
| V1 − (V2 + V4) | 8.6 | Yc62/f | 0.39 |
| CT5/CT6 | 2.83 | SD/TD | 0.92 |
| R7/f | −0.34 | TTL/ImgH | 1.55 |
| R8/f | −0.50 | | |

5th Embodiment

Figure 9:
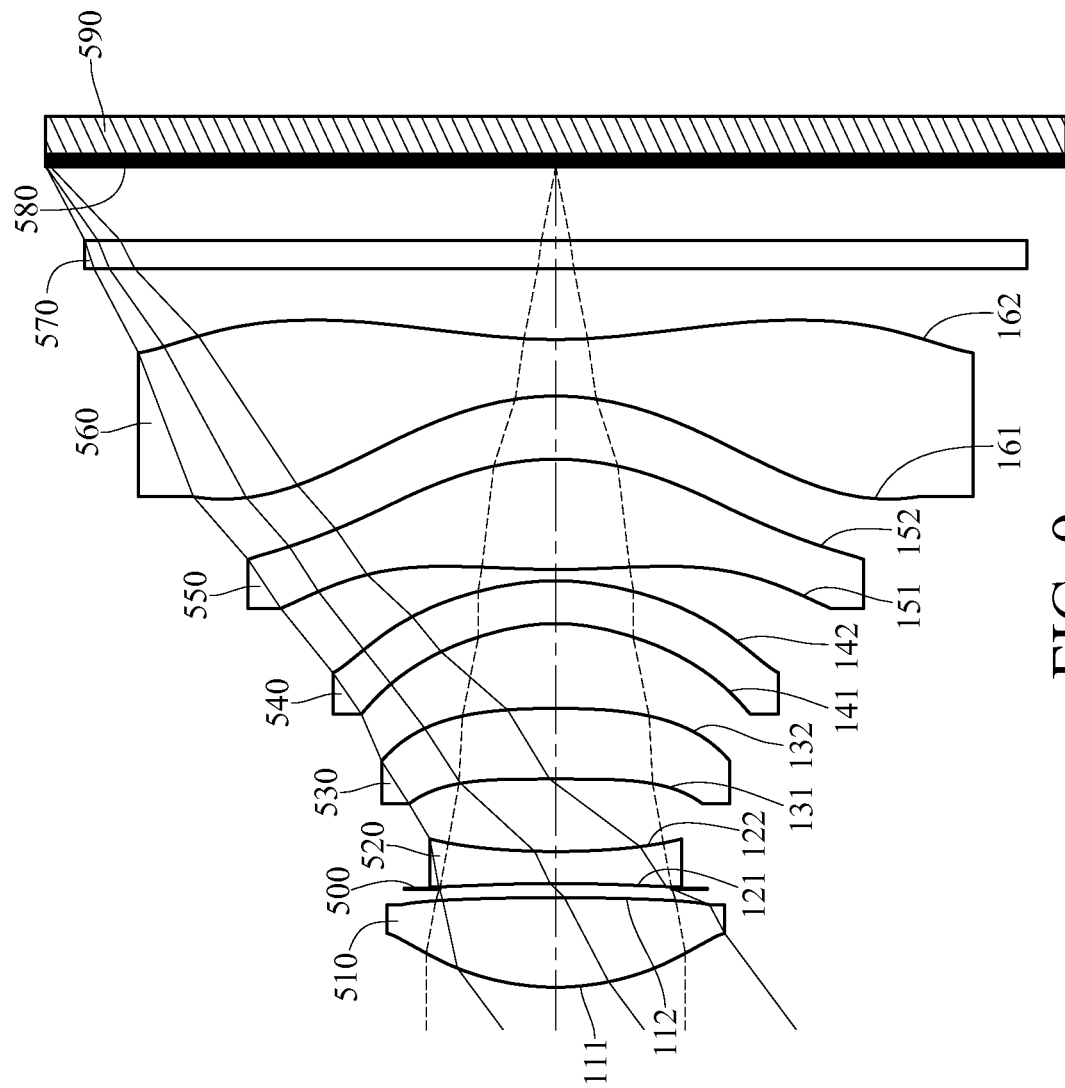
FIG. 9 is a schematic view of an optical imaging lens assembly according to the 5th embodiment of the present disclosure.
Figure 10:
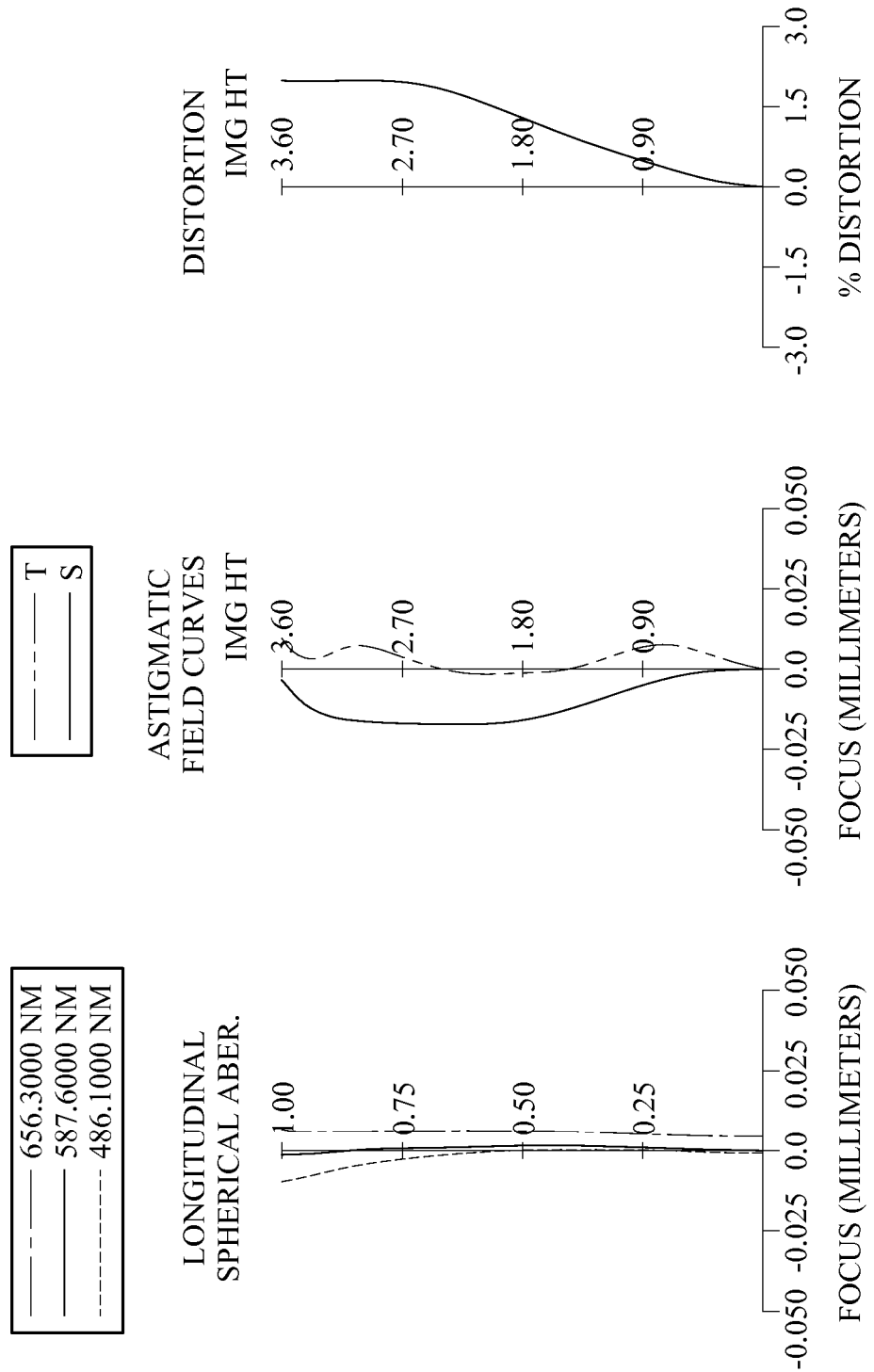
FIG. 10 shows spherical aberration curves, astigmatic field curves and a distortion curve of the optical imaging lens assembly according to the 5th embodiment.

FIG. 9 is a schematic view of an optical imaging lens assembly according to the 5th embodiment of the present disclosure. FIG. 10 shows spherical aberration curves, astigmatic field curves and a distortion curve of the optical imaging lens assembly according to the 5th embodiment. In FIG. 9, an optical imaging lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 570, an image plane 580 and an image sensor 590, wherein the image sensor 590 is located on the image plane 580, and the optical imaging lens assembly has a total of six lens elements (510-560) with refractive power.

The first lens element 510 with positive refractive power has a convex object-side surface 511 in a paraxial region and a convex image-side surface 512 in a paraxial region. The first lens element 510 is made of glass material and the object-side surface 511 and the image-side surface 512 thereof are aspheric.

The second lens element 520 with negative refractive power has a concave object-side surface 521 in a paraxial region and a concave image-side surface 522 in a paraxial region. The second lens element 520 is made of plastic material and the object-side surface 521 and the image-side surface 522 thereof are aspheric.

The third lens element 530 with positive refractive power has a concave object-side surface 531 in a paraxial region and a convex image-side surface 532 in a paraxial region. The third lens element 530 is made of plastic material and the object-side surface 531 and the image-side surface 532 thereof are aspheric.

The fourth lens element 540 with negative refractive power has a concave object-side surface 541 in a paraxial region and a convex image-side surface 542 in a paraxial region. The fourth lens element 540 is made of plastic material and the object-side surface 541 and the image-side surface 542 thereof are aspheric.

The fifth lens element 550 with positive refractive power has a convex object-side surface 551 in a paraxial region and a convex image-side surface 552 in a paraxial region. The fifth lens element 550 is made of plastic material and the object-side surface 551 and the image-side surface 552 thereof are aspheric.

The sixth lens element 560 with negative refractive power has a concave object-side surface 561 in a paraxial region, a concave image-side surface 562 in a paraxial region and at least one convex shape in an off-axial region of the image-side surface 562 of the sixth lens element 560. The sixth lens element 560 is made of plastic material and the object-side surface 561 and the image-side surface 562 thereof are aspheric.

The IR-cut filter 570 is made of glass material, wherein the IR-cut filter 570 is located between the sixth lens element 560 and the image plane 580, and will not affect the focal length of the optical imaging lens assembly.

The detailed optical data of the 5th embodiment are shown in Table 9 and the aspheric surface data are shown in Table 10 below.

TABLE 9

5th Embodiment
f = 4.76 mm, Fno = 2.60, HFOV = 36.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.862 | ASP | 0.634 | Glass | 1.523 | 51.5 | 3.27 |
| 2 | | −18.423 | ASP | 0.060 | | | | |
| 3 | Ape. Stop | Plano | | 0.040 | | | | |
| 4 | Lens 2 | −12.328 | 0.060 0.225 | | Plastic | 1.634 | 23.8 | −5.52 |
| 5 | | 4.923 | ASP | 0.514 | | | | |
| 6 | Lens 3 | −28.236 | ASP | 0.500 | Plastic | 1.543 | 56.5 | 11.91 |
| 7 | | −5.298 | ASP | 0.599 | | | | |
| 8 | Lens 4 | −1.420 | ASP | 0.302 | Plastic | 1.633 | 23.4 | −11.65 |
| 9 | | −1.903 | ASP | 0.080 | | | | |
| 10 | Lens 5 | 5.755 | ASP | 0.779 | Plastic | 1.544 | 55.9 | 2.83 |
| 11 | | −2.000 | ASP | 0.447 | | | | |
| 12 | Lens 6 | −1.899 | ASP | 0.400 | Plastic | 1.535 | 55.7 | −2.36 |
| 13 | | 4.070 | ASP | 0.500 | | | | |
| 14 | IR-cut filter | Plano | | 0.200 | Glass | 1.517 | 64.2 | — |
| 15 | | Plano | | 0.522 | | | | |
| 16 | Image | Plano | | — | | | | |

Note:
Reference wavelength is 587.6 nm (d-line).

TABLE 10

Aspheric Coefficients

| Surface # | 1 | 2 | 4 | 5 |
|---|---|---|---|---|
| k = | 2.5412E−01 | −3.0000E+01 | −3.0000E+01 | −1.6900E+01 |
| A4 = | −2.2024E−03 | −1.4174E−02 | −3.9870E−02 | −1.6332E−02 |
| A6 = | −4.0758E−03 | 2.4985E−02 | 1.1335E−01 | 8.6513E−02 |
| A8 = | 5.2890E−03 | −1.2570E−03 | −7.8107E−02 | −5.5774E−02 |
| A10 = | −1.7678E−02 | −4.4349E−02 | 1.7473E−03 | 1.4246E−02 |
| A12 = | 1.6565E−02 | 3.5690E−02 | 3.1229E−02 | 7.5981E−03 |
| A14 = | −9.2532E−03 | −1.0374E−02 | −9.1951E−03 | 3.6162E−03 |

| Surface # | 6 | 7 | 8 | 9 |
|---|---|---|---|---|
| k = | −1.0000E+00 | −1.0000E+00 | −5.4828E−01 | −4.8414E−01 |
| A4 = | −9.7637E−02 | −6.2139E−02 | 1.7643E−01 | 7.4236E−02 |
| A6 = | −3.8229E−02 | −3.1135E−02 | −1.9369E−01 | −7.6136E−02 |
| A8 = | 2.8869E−02 | 1.2625E−02 | 1.4151E−01 | 4.3002E−02 |
| A10 = | −2.2511E−02 | −3.9903E−03 | −7.5361E−02 | −1.9581E−02 |
| A12 = | −1.9669E−02 | −3.5091E−03 | 2.3381E−02 | 5.3305E−03 |
| A14 = | 1.6618E−02 | 1.4528E−03 | −3.0651E−03 | −4.4169E−04 |

| Surface # | 10 | 11 | 12 | 13 |
|---|---|---|---|---|
| k = | −1.0000E+00 | −2.0599E+00 | −1.7583E+00 | −1.6400E+01 |
| A4 = | −1.0563E−01 | −1.3191E−02 | −3.6742E−03 | −1.8852E−02 |
| A6 = | 4.7900E−02 | 7.0168E−04 | 7.4665E−03 | 3.6300E−03 |
| A8 = | −1.7999E−02 | 9.7643E−03 | −9.5803E−04 | −7.1785E−04 |
| A10 = | 3.2489E−03 | −4.3657E−03 | 1.7378E−05 | 8.7911E−05 |
| A12 = | −8.7293E−05 | 7.5724E−04 | 5.8295E−06 | −6.1878E−06 |
| A14 = | −2.3638E−05 | −4.8586E−05 | −3.8971E−07 | 2.1820E−07 |

In the optical imaging lens assembly according to the 5th embodiment, the definitions of these parameters shown in the following table are the same as those stated in the 1st embodiment with corresponding values for the 5th embodiment.

| 5th Embodiment | | | |
|---|---|---|---|
| f [mm] | 4.76 | R10/f | −0.42 |
| Fno | 2.60 | (R11 + R12)/(R11 − R12) | −0.36 |
| HFOV [deg.] | 36.6 | f5/f6 | −1.20 |
| N1 | 1.523 | f/f6 | −2.01 |

-continued

| 5th Embodiment | | | |
|---|---|---|---|
| V2 | 23.8 | SAG61/T56 | −1.59 |
| V1 − (V2 + V4) | 4.3 | Yc62/f | 0.36 |
| CT5/CT6 | 1.95 | SD/TD | 0.85 |
| R7/f | −0.30 | TTL/ImgH | 1.59 |
| R8/f | −0.40 | | |

6th Embodiment

Figure 11:
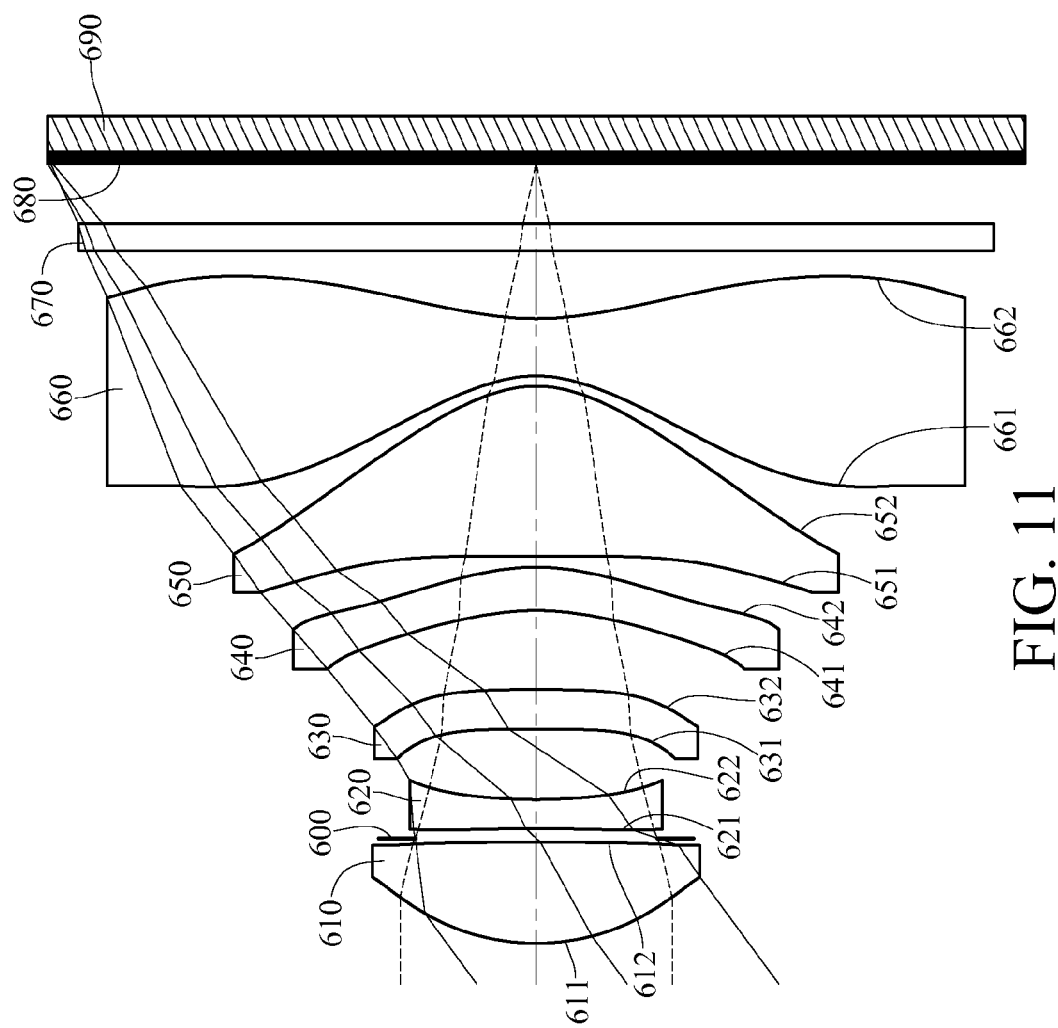
FIG. 11 is a schematic view of an optical imaging lens assembly according to the 6th embodiment of the present disclosure.
Figure 12:
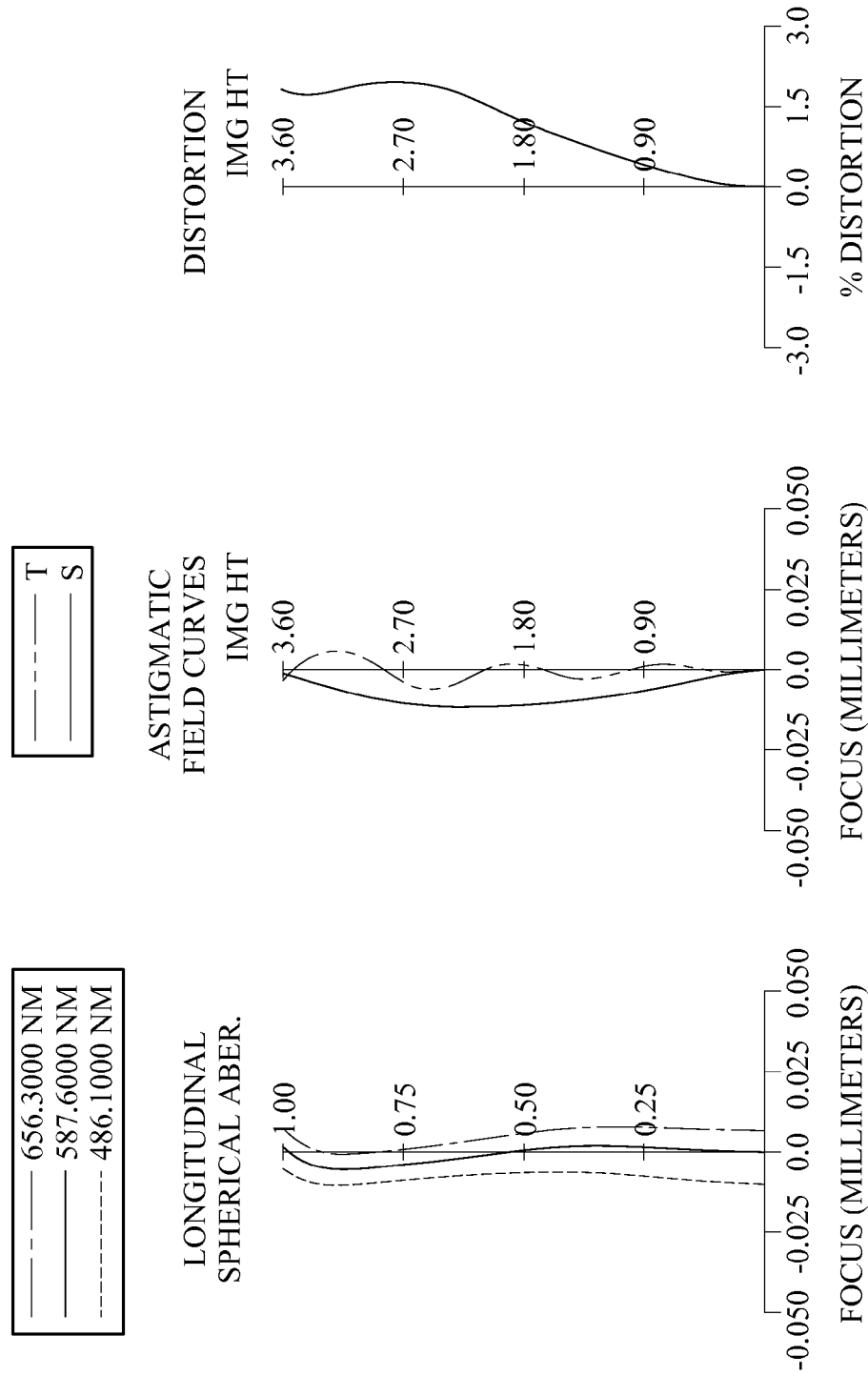
FIG. 12 shows spherical aberration curves, astigmatic field curves and a distortion curve of the optical imaging lens assembly according to the 6th embodiment.

FIG. 11 is a schematic view of an optical imaging lens assembly according to the 6th embodiment of the present disclosure. FIG. 12 shows spherical aberration curves, astigmatic field curves and a distortion curve of the optical imaging lens assembly according to the 6th embodiment. In FIG. 11, an optical imaging lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670, an image plane 680 and an image sensor 690, wherein the image sensor 690 is located on the image plane 680, and the optical imaging lens assembly has a total of six lens elements (610-660) with refractive power.

The first lens element 610 with positive refractive power has a convex object-side surface 611 in a paraxial region and a convex image-side surface 612 in a paraxial region. The first lens element 610 is made of plastic material and the object-side surface 611 and the image-side surface 612 thereof are aspheric.

The second lens element 620 with negative refractive power has a concave object-side surface 621 in a paraxial region and a concave image-side surface 622 in a paraxial region. The second lens element 620 is made of plastic material and the object-side surface 621 and the image-side surface 622 thereof are aspheric.

The third lens element 630 with positive refractive power has a concave object-side surface 631 in a paraxial region and a convex image-side surface 632 in a paraxial region. The third lens element 630 is made of plastic material and the object-side surface 631 and the image-side surface 632 thereof are aspheric.

The fourth lens element 640 with positive refractive power has a concave object-side surface 641 in a paraxial region and a convex image-side surface 642 in a paraxial region. The fourth lens element 640 is made of plastic material and the object-side surface 641 and the image-side surface 642 thereof are aspheric.

The fifth lens element 650 with positive refractive power has a convex object-side surface 651 in a paraxial region and a convex image-side surface 652 in a paraxial region. The fifth lens element 650 is made of plastic material and the object-side surface 651 and the image-side surface 652 thereof are aspheric.

The sixth lens element 660 with negative refractive power has a concave object-side surface 661 in a paraxial region, a concave image-side surface 662 in a paraxial region and at least one convex shape in an off-axial region of the image-side surface 662 of the sixth lens element 660. The sixth lens element 660 is made of plastic material and the object-side surface 661 and the image-side surface 662 thereof are aspheric.

The IR-cut filter 670 is made of glass material, wherein the IR-cut filter 670 is located between the sixth lens element 660 and the image plane 680, and will not affect the focal length of the optical imaging lens assembly.

The detailed optical data of the 6th embodiment are shown in Table 11 and the aspheric surface data are shown in Table 12 below.

TABLE 11

6th Embodiment
f = 4.81 mm, Fno = 2.40, HFOV = 36.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.644 | ASP | 0.746 | Plastic | 1.514 | 56.8 | 3.13 |
| 2 | | −59.683 | ASP | 0.030 | | | | |
| 3 | Ape. Stop | Plano | | 0.070 | | | | |
| 4 | Lens 2 | −19.928 | ASP | 0.215 | Plastic | 1.634 | 23.8 | −5.49 |
| 5 | | 4.233 | ASP | 0.519 | | | | |
| 6 | Lens 3 | −75.426 | ASP | 0.293 | Plastic | 1.583 | 30.2 | 35.09 |
| 7 | | −16.124 | ASP | 0.583 | | | | |
| 8 | Lens 4 | −1.969 | ASP | 0.319 | Plastic | 1.544 | 55.9 | 20.87 |
| 9 | | −1.774 | ASP | 0.080 | | | | |
| 10 | Lens 5 | 18.898 | ASP | 1.257 | Plastic | 1.530 | 55.8 | 1.64 |
| 11 | | −0.888 | ASP | 0.075 | | | | |
| 12 | Lens 6 | −0.994 | ASP | 0.423 | Plastic | 1.535 | 55.7 | −1.24 |
| 13 | | 2.301 | ASP | 0.500 | | | | |
| 14 | IR-cut filter | Plano | | 0.200 | Glass | 1.517 | 64.2 | — |
| 15 | | Plano | | 0.441 | | | | |
| 16 | Image | Plano | | — | | | | |

Note:
Reference wavelength is 587.6 nm (d-line).

TABLE 12

Aspheric Coefficients

| Surface # | 1 | 2 | 4 | 5 |
|---|---|---|---|---|
| k = | 3.6125E−01 | 2.0000E+01 | −3.0000E+01 | −1.1229E+01 |
| A4 = | −8.3765E−03 | −2.3255E−02 | −3.3841E−02 | 6.9080E−03 |
| A6 = | −2.4955E−03 | 3.7280E−02 | 1.2746E−01 | 1.1049E−01 |
| A8 = | −9.0322E−04 | −1.1036E−02 | −9.7338E−02 | −9.2165E−02 |

TABLE 12-continued

| Aspheric Coefficients | | | | |
|---|---|---|---|---|
| A10 = | −1.4567E−02 | −3.8521E−02 | 1.3030E−02 | 4.2668E−02 |
| A12 = | 1.6565E−02 | 3.5690E−02 | 3.1229E−02 | 7.5981E−03 |
| A14 = | −9.2532E−03 | −1.0374E−02 | −9.1951E−03 | 3.6162E−03 |

| Surface # | 6 | 7 | 8 | 9 |
|---|---|---|---|---|
| k = | −1.0000E+00 | −1.0000E+00 | −1.4133E−01 | −9.7707E−01 |
| A4 = | −1.4034E−01 | −9.9023E−02 | 1.5727E−01 | 1.0672E−01 |
| A6 = | −3.3696E−02 | −3.9793E−02 | −1.6312E−01 | −6.0942E−02 |
| A8 = | 4.0440E−03 | 2.8620E−02 | 1.4487E−01 | 4.5054E−02 |
| A10 = | −1.4253E−02 | −1.1348E−02 | −7.8379E−02 | −2.0444E−02 |
| A12 = | −1.9669E−02 | −8.4276E−03 | 2.3381E−02 | 4.7147E−03 |
| A14 = | 1.6618E−02 | 8.6275E−03 | −3.0651E−03 | −4.5758E−04 |

| Surface # | 10 | 11 | 12 | 13 |
|---|---|---|---|---|
| k = | −1.0000E+00 | −2.6913E+00 | −3.4393E+00 | −8.8317E+00 |
| A4 = | −8.1160E−02 | −1.3955E−02 | −4.3938E−03 | −2.0276E−02 |
| A6 = | 4.6570E−02 | −3.7708E−03 | 7.0620E−03 | 4.6170E−03 |
| A8 = | −1.7829E−02 | 9.7148E−03 | −9.9534E−04 | −8.3517E−04 |
| A10 = | 3.2375E−03 | −4.2541E−03 | 1.7293E−05 | 9.0614E−05 |
| A12 = | −1.0074E−04 | 7.7004E−04 | 5.9423E−06 | −5.4776E−06 |
| A14 = | −2.3168E−05 | −5.0682E−05 | −3.4061E−07 | 1.4575E−07 |

In the optical imaging lens assembly according to the 6th embodiment, the definitions of these parameters shown in the following table are the same as those stated in the 1st embodiment with corresponding values for the 6th embodiment.

| 6th Embodiment | | | |
|---|---|---|---|
| f [mm] | 4.81 | R10/f | −0.18 |
| Fno | 2.40 | (R11 + R12)/(R11 − R12) | −0.40 |
| HFOV [deg.] | 36.3 | f5/f6 | −1.32 |
| N1 | 1.514 | f/f6 | −3.87 |
| V2 | 23.8 | SAG61/T56 | −10.83 |
| V1 − (V2 + V4) | −22.9 | Yc62/f | 0.46 |
| CT5/CT6 | 2.97 | SD/TD | 0.83 |
| R7/f | −0.41 | TTL/ImgH | 1.58 |
| R8/f | −0.37 | | |

7th Embodiment

Figure 13:
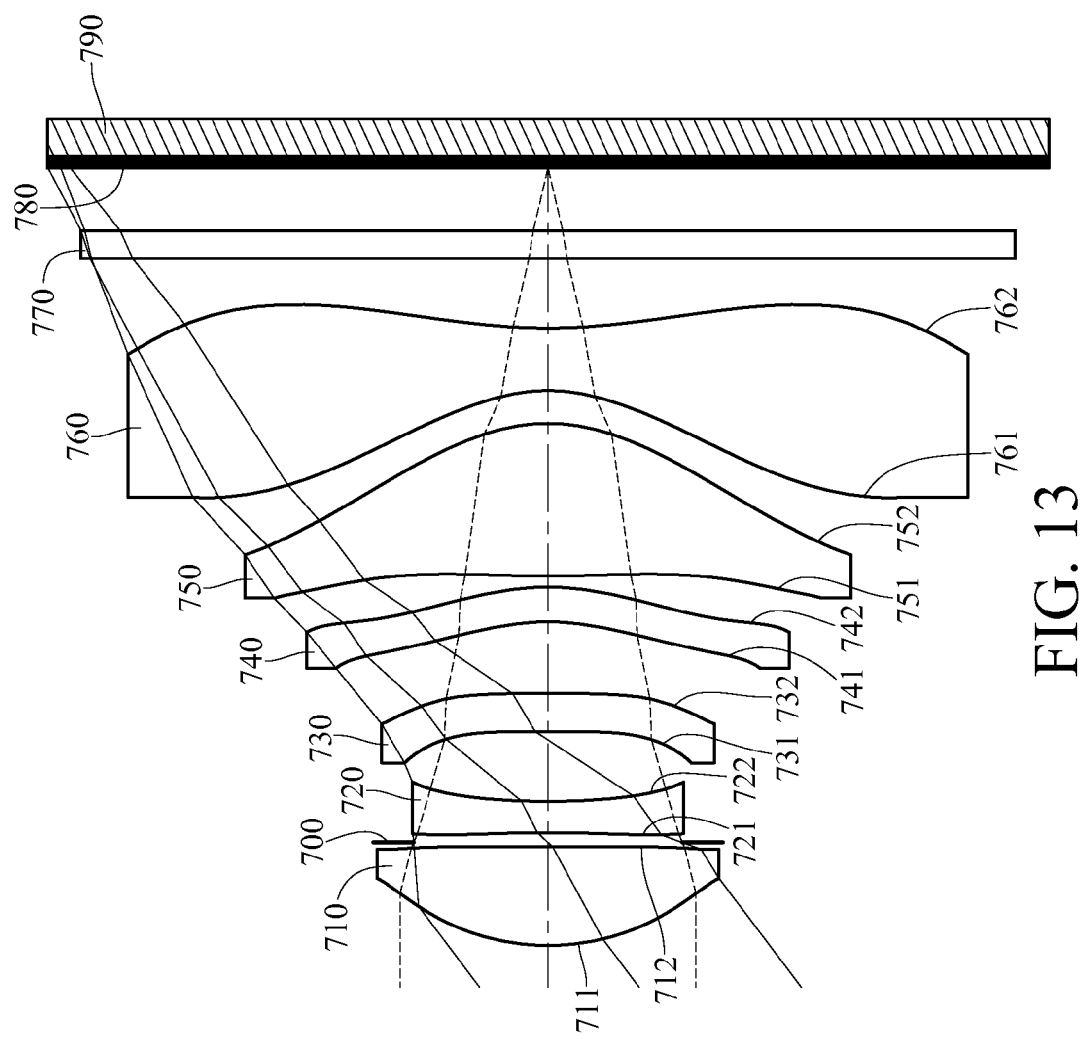
FIG. 13 is a schematic view of an optical imaging lens assembly according to the 7th embodiment of the present disclosure.
Figure 14:
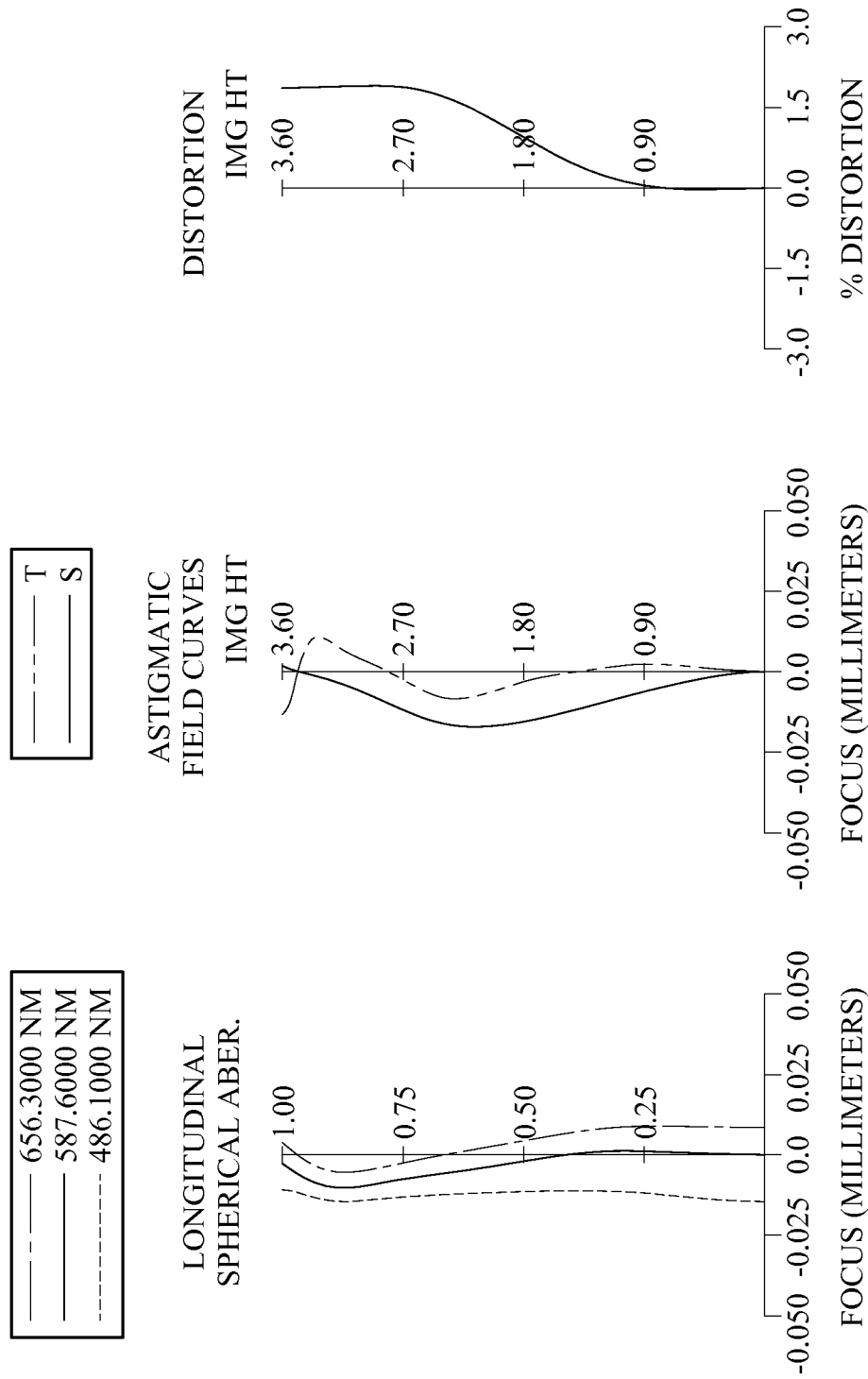
FIG. 14 shows spherical aberration curves, astigmatic field curves and a distortion curve of the optical imaging lens assembly according to the 7th embodiment.

FIG. 13 is a schematic view of an optical imaging lens assembly according to the 7th embodiment of the present disclosure. FIG. 14 shows spherical aberration curves, astigmatic field curves and a distortion curve of the optical imaging lens assembly according to the 7th embodiment. In FIG. 13, an optical imaging lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 770, an image plane 780 and an image sensor 790, wherein the image sensor 790 is located on the image plane 780, and the optical imaging lens assembly has a total of six lens elements (710-760) with refractive power.

The first lens element 710 with positive refractive power has a convex object-side surface 711 in a paraxial region and a concave image-side surface 712 in a paraxial region. The first lens element 710 is made of plastic material and the object-side surface 711 and the image-side surface 712 thereof are aspheric.

The second lens element 720 with negative refractive power has a concave object-side surface 721 in a paraxial region and a concave image-side surface 722 in a paraxial region. The second lens element 720 is made of plastic material and the object-side surface 721 and the image-side surface 722 thereof are aspheric.

The third lens element 730 with positive refractive power has a concave object-side surface 731 in a paraxial region and a convex image-side surface 732 in a paraxial region. The third lens element 730 is made of plastic material and the object-side surface 731 and the image-side surface 732 thereof are aspheric.

The fourth lens element 740 with negative refractive power has a concave object-side surface 741 in a paraxial region and a convex image-side surface 742 in a paraxial region. The fourth lens element 740 is made of plastic material and the object-side surface 741 and the image-side surface 742 thereof are aspheric.

The fifth lens element 750 with positive refractive power has a convex object-side surface 751 in a paraxial region and a convex image-side surface 752 in a paraxial region. The fifth lens element 750 is made of plastic material and the object-side surface 751 and the image-side surface 752 thereof are aspheric.

The sixth lens element 760 with negative refractive power has a concave object-side surface 761 in a paraxial region, a concave image-side surface 762 in a paraxial region and at least one convex shape in an off-axial region of the image-side surface 762 of the sixth lens element 760. The sixth lens element 760 is made of plastic material and the object-side surface 761 and the image-side surface 762 thereof are aspheric.

The IR-cut filter 770 is made of glass material, wherein the IR-cut filter 770 is located between the sixth lens element 760 and the image plane 780, and will not affect the focal length of the optical imaging lens assembly.

The detailed optical data of the 7th embodiment are shown in Table 13 and the aspheric surface data are shown in Table 14 below.

TABLE 13

7th Embodiment
f = 4.69 mm, Fno = 2.20, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.691 | ASP | 0.712 | Plastic | 1.544 | 55.9 | 3.14 |
| 2 | | 136.205 | ASP | 0.030 | | | | |
| 3 | Ape. Stop | Plano | | 0.070 | | | | |
| 4 | Lens 2 | −14.958 | ASP | 0.226 | Plastic | 1.634 | 23.8 | −5.92 |
| 5 | | 5.045 | ASP | 0.504 | | | | |
| 6 | Lens 3 | −74.959 | ASP | 0.275 | Plastic | 1.640 | 23.3 | 107.97 |
| 7 | | −36.002 | ASP | 0.516 | | | | |
| 8 | Lens 4 | −1.687 | ASP | 0.250 | Plastic | 1.543 | 56.5 | −62.88 |
| 9 | | −1.868 | ASP | 0.080 | | | | |
| 10 | Lens 5 | 8.208 | ASP | 1.100 | Plastic | 1.544 | 55.9 | 2.16 |
| 11 | | −1.307 | ASP | 0.237 | | | | |
| 12 | Lens 6 | −1.263 | ASP | 0.451 | Plastic | 1.535 | 55.7 | −1.75 |
| 13 | | 4.070 | ASP | 0.500 | | | | |
| 14 | IR-cut filter | Plano | | 0.200 | Glass | 1.517 | 64.2 | — |
| 15 | | Plano | | 0.453 | | | | |
| 16 | Image | Plano | | — | | | | |

Note:
Reference wavelength is 587.6 nm (d-line).

TABLE 14

Aspheric Coefficients

| Surface # | 1 | 2 | 4 | 5 |
|---|---|---|---|---|
| k = | 4.0930E−01 | −3.0000E+01 | −1.1330E+00 | −1.4431E+01 |
| A4 = | −7.8953E−03 | −2.7536E−02 | −3.3415E−02 | 7.3484E−04 |
| A6 = | −1.9666E−03 | 4.1138E−02 | 1.2801E−01 | 1.0456E−01 |
| A8 = | −2.6337E−04 | −1.4337E−02 | −9.9483E−02 | −8.6330E−02 |
| A10 = | −1.4661E−02 | −3.7435E−02 | 1.3631E−02 | 3.4419E−02 |
| A12 = | 1.6578E−02 | 3.5690E−02 | 3.1229E−02 | 7.5981E−03 |
| A14 = | −9.2532E−03 | −1.0374E−02 | −9.1951E−03 | 3.6162E−03 |

| Surface # | 6 | 7 | 8 | 9 |
|---|---|---|---|---|
| k = | −1.0000E+00 | −1.0000E+00 | −9.0597E−01 | −1.1280E+00 |
| A4 = | −1.5355E−01 | −1.0167E−01 | 2.0206E−01 | 1.1144E−01 |
| A6 = | −3.3574E−02 | −3.2590E−02 | −1.7001E−01 | −5.9298E−02 |
| A8 = | 6.1608E−04 | 2.7856E−02 | 1.4244E−01 | 4.5122E−02 |
| A10 = | −4.4864E−04 | −7.4490E−03 | −7.8214E−02 | −2.0651E−02 |
| A12 = | −1.9669E−02 | −6.0925E−03 | 2.3375E−02 | 4.6702E−03 |
| A14 = | 1.6618E−02 | 7.0214E−03 | −3.0672E−03 | −4.4968E−04 |

| Surface # | 10 | 11 | 12 | 13 |
|---|---|---|---|---|
| k = | −1.0000E+00 | −2.6499E+00 | −3.5593E+00 | −4.7442E+00 |
| A4 = | −8.7042E−02 | −1.2594E−02 | −5.9352E−03 | −2.5965E−02 |
| A6 = | 4.5795E−02 | −1.8675E−03 | 6.8493E−03 | 4.8090E−03 |
| A8 = | −1.7405E−02 | 9.6591E−03 | −9.7057E−04 | −8.2830E−04 |
| A10 = | 3.3100E−03 | −4.2979E−03 | 2.0446E−05 | 8.7227E−05 |
| A12 = | −1.0685E−04 | 7.6693E−04 | 6.0885E−06 | −5.3517E−06 |
| A14 = | −2.7258E−05 | −4.9771E−05 | −3.8619E−07 | 1.5544E−07 |

In the optical imaging lens assembly according to the 7th embodiment, the definitions of these parameters shown in the following table are the same as those stated in the 1st embodiment with corresponding values for the 7th embodiment.

| 7th Embodiment | | | |
|---|---|---|---|
| f [mm] | 4.69 | R10/f | −0.28 |
| Fno | 2.20 | (R11 + R12)/(R11 − R12) | −0.53 |
| HFOV [deg.] | 37.1 | f5/f6 | −1.23 |
| N1 | 1.544 | f/f6 | −2.68 |

-continued

| 7th Embodiment | | | |
|---|---|---|---|
| V2 | 23.8 | SAG61/T56 | −3.25 |
| V1 − (V2 + V4) | −24.4 | Yc62/f | 0.39 |
| CT5/CT6 | 2.44 | SD/TD | 0.83 |
| R7/f | −0.36 | TTL/ImgH | 1.54 |
| R8/f | −0.40 | | |

8th Embodiment

Figure 15:
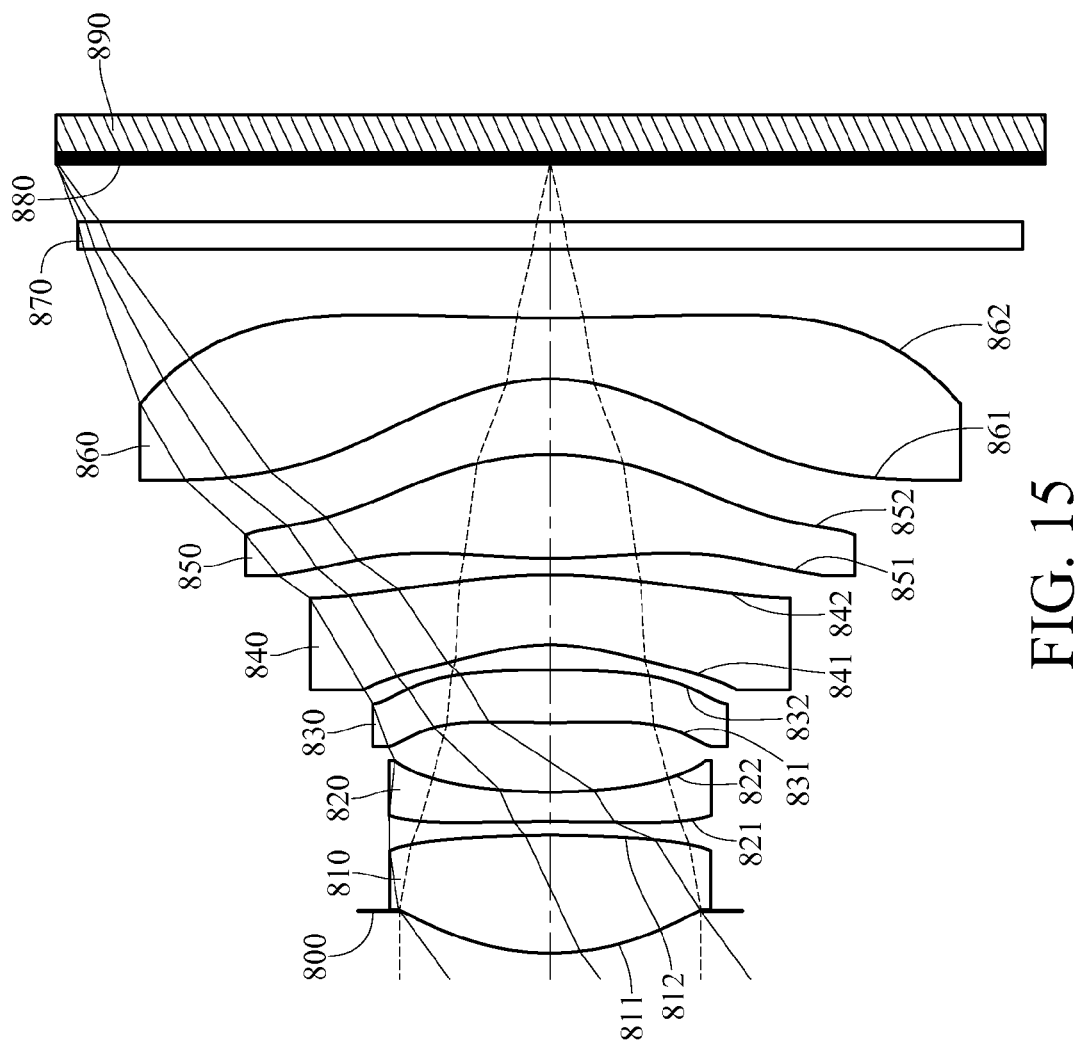
FIG. 15 is a schematic view of an optical imaging lens assembly according to the 8th embodiment of the present disclosure.
Figure 16:
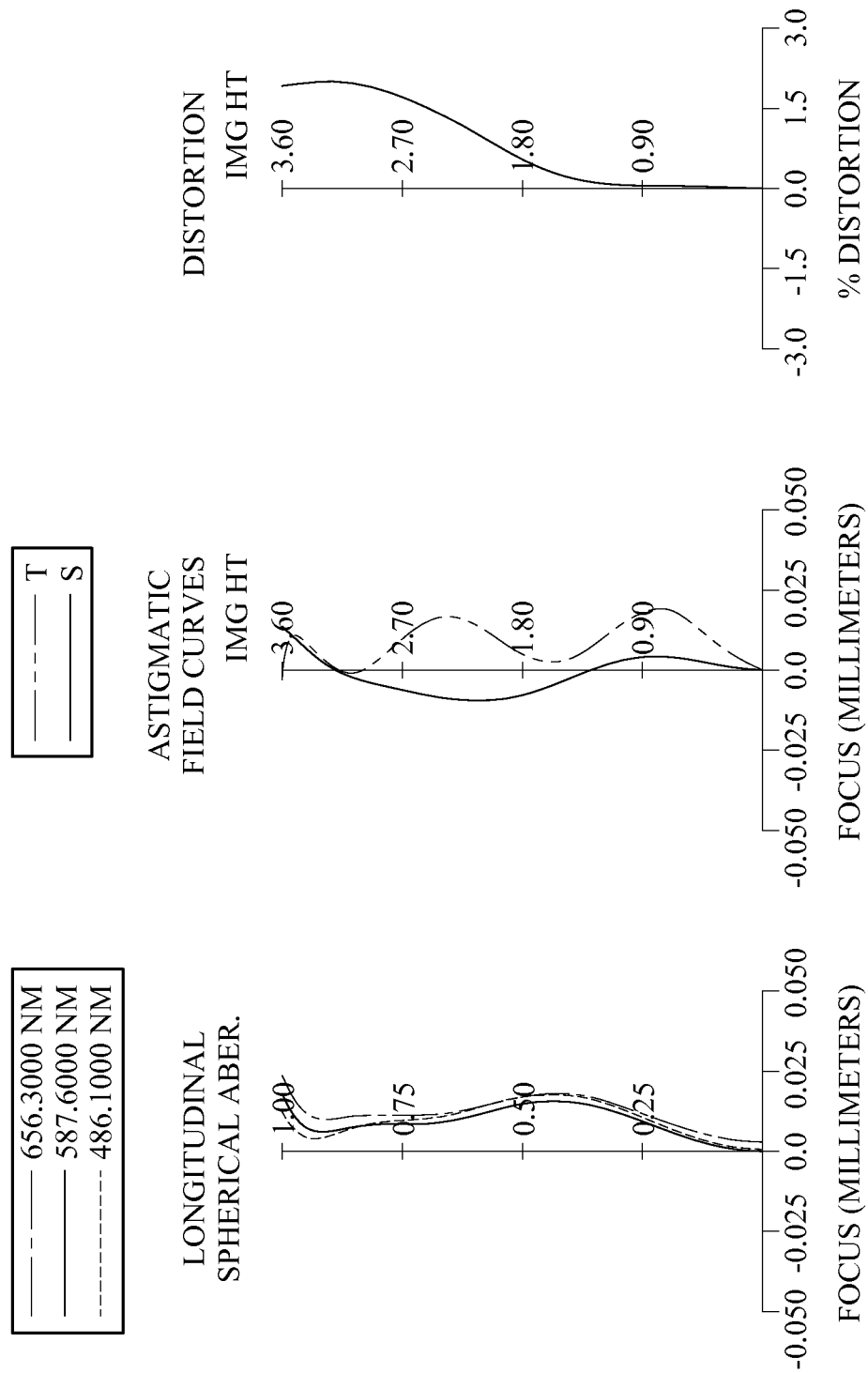
FIG. 16 shows spherical aberration curves, astigmatic field curves and a distortion curve of the optical imaging lens assembly according to the 8th embodiment.

FIG. 15 is a schematic view of an optical imaging lens assembly according to the 8th embodiment of the present disclosure. FIG. 16 shows spherical aberration curves, astigmatic field curves and a distortion curve of the optical imaging lens assembly according to the 8th embodiment. In FIG. 15, an optical imaging lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870, an image plane 880 and an image sensor 890, wherein the image sensor 890 is located on the image plane 880, and the optical imaging lens assembly has a total of six lens elements (810-860) with refractive power.

The first lens element 810 with positive refractive power has a convex object-side surface 811 in a paraxial region and a convex image-side surface 812 in a paraxial region. The first lens element 810 is made of plastic material and the object-side surface 811 and the image-side surface 812 thereof are aspheric.

The second lens element 820 with negative refractive power has a concave object-side surface 821 in a paraxial region and a concave image-side surface 822 in a paraxial region. The second lens element 820 is made of plastic material and the object-side surface 821 and the image-side surface 822 thereof are aspheric.

The third lens element 830 with positive refractive power has a convex object-side surface 831 in a paraxial region and a convex image-side surface 832 in a paraxial region. The third lens element 830 is made of plastic material and the object-side surface 831 and the image-side surface 832 thereof are aspheric.

The fourth lens element 840 with negative refractive power has a concave object-side surface 841 in a paraxial region and a convex image-side surface 842 in a paraxial region. The fourth lens element 840 is made of plastic material and the object-side surface 841 and the image-side surface 842 thereof are aspheric.

The fifth lens element 850 with positive refractive power has a convex object-side surface 851 in a paraxial region and a convex image-side surface 852 in a paraxial region. The fifth lens element 850 is made of plastic material and the object-side surface 851 and the image-side surface 852 thereof are aspheric.

The sixth lens element 860 with negative refractive power has a concave object-side surface 861 in a paraxial region, a concave image-side surface 862 in a paraxial region and at least one convex shape in an off-axial region of the image-side surface 862 of the sixth lens element 860. The sixth lens element 860 is made of plastic material and the object-side surface 861 and the image-side surface 862 thereof are aspheric.

The IR-cut filter 870 is made of glass material, wherein the IR-cut filter 870 is located between the sixth lens element 860 and the image plane 880, and will not affect the focal length of the optical imaging lens assembly.

The detailed optical data of the 8th embodiment are shown in Table 15 and the aspheric surface data are shown in Table 16 below.

TABLE 15

8th Embodiment
f = 4.82 mm, Fno = 2.20, HFOV = 36.2 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.307 |  |  |  |  |
| 2 | Lens 1 | 1.931 | ASP | 0.857 | Plastic | 1.544 | 55.9 | 3.01 |
| 3 |  | −9.074 | ASP | 0.100 |  |  |  |  |
| 4 | Lens 2 | −24.320 | ASP | 0.215 | Plastic | 1.634 | 23.8 | −5.19 |
| 5 |  | 3.820 | ASP | 0.508 |  |  |  |  |
| 6 | Lens 3 | 11.493 | ASP | 0.385 | Plastic | 1.640 | 23.3 | 6.86 |
| 7 |  | −7.008 | ASP | 0.182 |  |  |  |  |
| 8 | Lens 4 | −1.510 | ASP | 0.510 | Plastic | 1.633 | 23.4 | −4.37 |
| 9 |  | −3.761 | ASP | 0.120 |  |  |  |  |
| 10 | Lens 5 | 4.555 | ASP | 0.757 | Plastic | 1.544 | 55.9 | 2.81 |
| 11 |  | −2.165 | ASP | 0.550 |  |  |  |  |
| 12 | Lens 6 | −1.531 | ASP | 0.446 | Plastic | 1.530 | 55.8 | −2.63 |
| 13 |  | 17.178 | ASP | 0.500 |  |  |  |  |
| 14 | IR-cut filter | Plano |  | 0.200 | Glass | 1.517 | 64.2 | — |
| 15 |  | Plano |  | 0.420 |  |  |  |  |
| 16 | Image | Plano |  | — |  |  |  |  |

Note:
Reference wavelength is 587.6 nm (d-line).

TABLE 16

Aspheric Coefficients

| Surface # | 2 | 3 | 4 | 5 |
|---|---|---|---|---|
| k = | 7.6843E−02 | −3.0000E+01 | −3.0000E+01 | −1.2415E+01 |
| A4 = | −6.3770E−03 | −7.3492E−03 | −2.4665E−02 | −1.5345E−02 |
| A6 = | −6.4385E−03 | 1.5997E−02 | 1.2199E−01 | 9.0659E−02 |
| A8 = | 8.0328E−03 | −8.7482E−03 | −1.0174E−01 | −5.7983E−02 |
| A10 = | −2.2354E−02 | −3.8549E−02 | 1.8164E−02 | 2.1898E−02 |

TABLE 16-continued

| Aspheric Coefficients | | | | |
|---|---|---|---|---|
| A12 = | 1.6882E−02 | 3.7636E−02 | 2.5198E−02 | −7.4282E−03 |
| A14 = | −6.0261E−03 | −1.1275E−02 | −1.0187E−02 | 7.0223E−03 |

| Surface # | 6 | 7 | 8 | 9 |
|---|---|---|---|---|
| k = | −1.0000E+00 | −1.0000E+00 | −2.1873E+00 | 1.4498E+00 |
| A4 = | −1.0041E−01 | 2.3594E−03 | 2.1577E−01 | 8.2386E−02 |
| A6 = | −5.4755E−02 | −7.4969E−02 | −1.9208E−01 | −6.5337E−02 |
| A8 = | 1.2138E−02 | 2.0524E−02 | 1.3085E−01 | 4.6054E−02 |
| A10 = | 8.2498E−03 | −5.8318E−04 | −7.5841E−02 | −1.9975E−02 |
| A12 = | −1.8062E−02 | −4.6315E−03 | 2.7181E−02 | 4.6953E−03 |
| A14 = | 1.4723E−02 | 4.4264E−03 | −4.3228E−03 | −4.4573E−04 |

| Surface # | 10 | 11 | 12 | 13 |
|---|---|---|---|---|
| k = | −1.0000E+00 | −1.7081E+00 | −2.1290E+00 | 1.9206E+01 |
| A4 = | −1.0546E−01 | −7.1294E−03 | 1.0927E−02 | −9.9162E−03 |
| A6 = | 4.3801E−02 | 1.3456E−03 | 5.2881E−03 | 8.0780E−04 |
| A8 = | −1.5910E−02 | 9.7951E−03 | −1.0480E−03 | −4.2269E−04 |
| A10 = | 3.2700E−03 | −4.3804E−03 | 2.8363E−05 | 7.5943E−05 |
| A12 = | −1.2235E−04 | 7.5005E−04 | 7.2871E−06 | −6.7057E−06 |
| A14 = | −2.8190E−05 | −4.7924E−05 | −5.1342E−07 | 2.3001E−07 |

In the optical imaging lens assembly according to the 8th embodiment, the definitions of these parameters shown in the following table are the same as those stated in the 1st embodiment with corresponding values for the 8th embodiment.

| 8th Embodiment | | | |
|---|---|---|---|
| f [mm] | 4.82 | R10/f | −0.45 |
| Fno | 2.20 | (R11 + R12)/(R11 − R12) | −0.84 |
| HFOV [deg.] | 36.2 | f5/f6 | −1.07 |
| N1 | 1.544 | f/f6 | −1.83 |
| V2 | 23.8 | SAG61/T56 | −1.34 |
| V1 − (V2 + V4) | 8.7 | Yc62/f | 0.26 |
| CT5/CT6 | 1.70 | SD/TD | 0.93 |
| R7/f | −0.31 | TTL/ImgH | 1.58 |
| R8/f | −0.78 | | |

9th Embodiment

Figure 17:
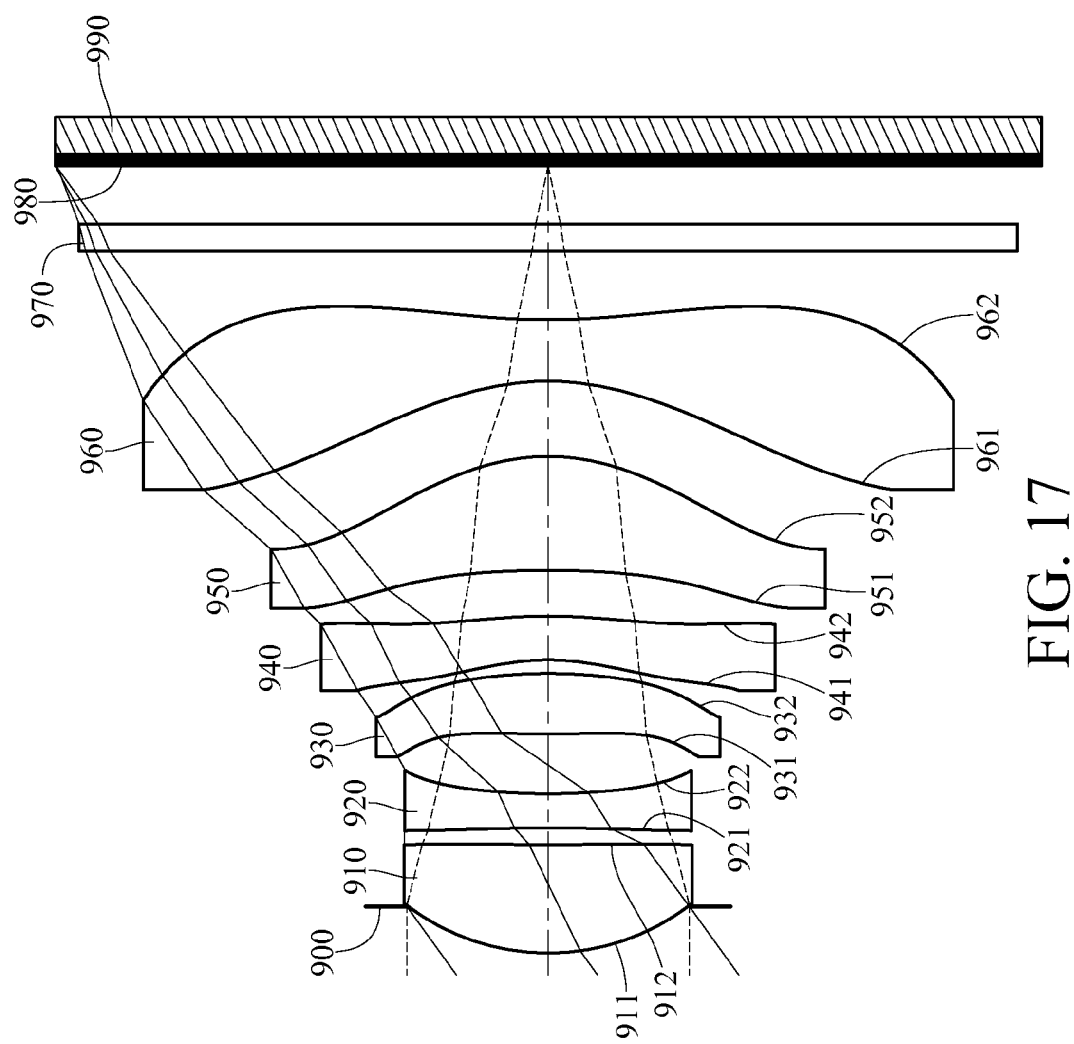
FIG. 17 is a schematic view of an optical imaging lens assembly according to the 9th embodiment of the present disclosure.
Figure 18:
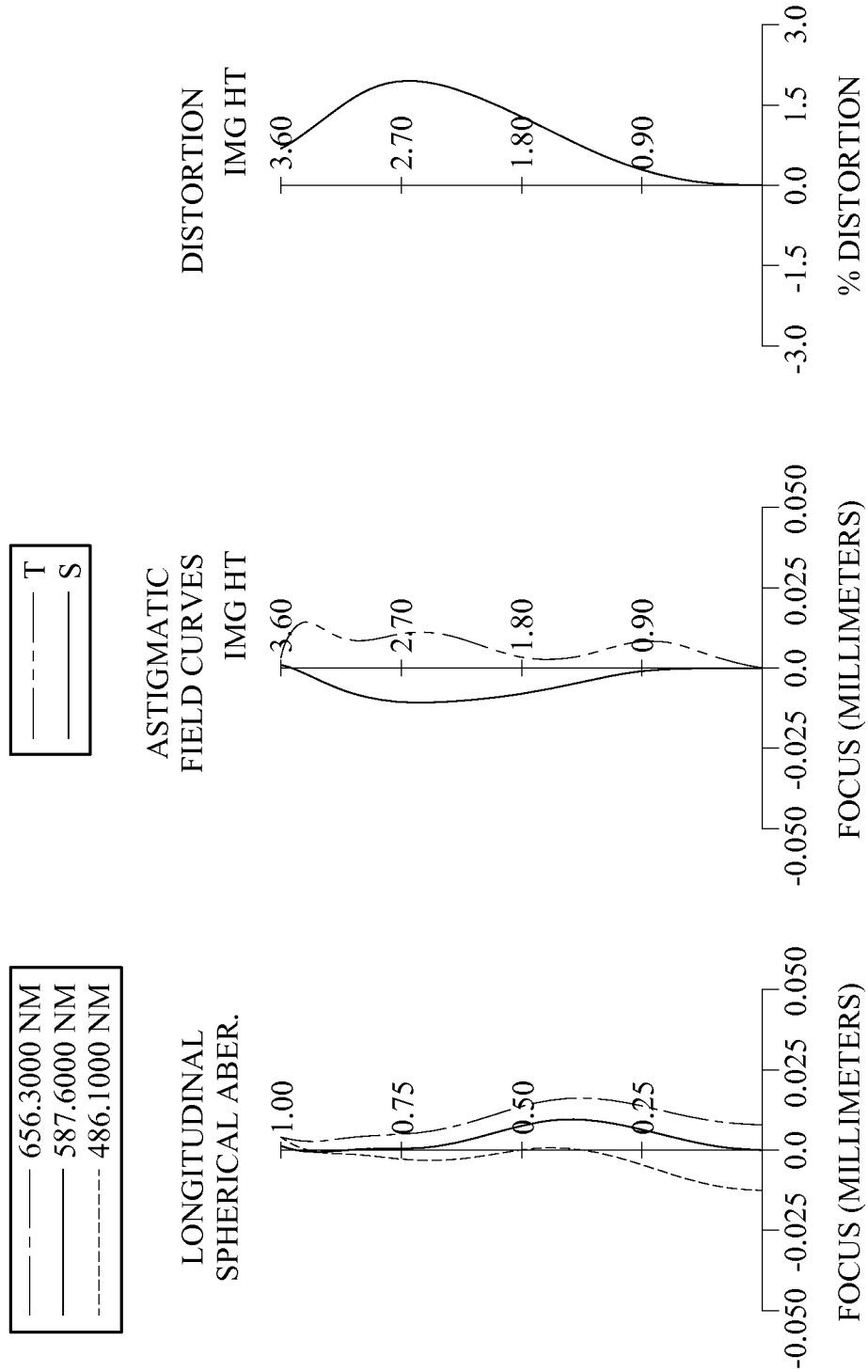
FIG. 18 shows spherical aberration curves, astigmatic field curves and a distortion curve of the optical imaging lens assembly according to the 9th embodiment.

FIG. 17 is a schematic view of an optical imaging lens assembly according to the 8th embodiment of the present disclosure. FIG. 18 shows spherical aberration curves, astigmatic field curves and a distortion curve of the optical imaging lens assembly according to the 8th embodiment. In FIG. 17, an optical imaging lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 970, an image plane 980 and an image sensor 990, wherein the image sensor 990 is located on the image plane 980, and the optical imaging lens assembly has a total of six lens elements (910-960) with refractive power.

The first lens element 910 with positive refractive power has a convex object-side surface 911 in a paraxial region and a concave image-side surface 912 in a paraxial region. The first lens element 910 is made of plastic material and the object-side surface 911 and the image-side surface 912 thereof are aspheric.

The second lens element 920 with negative refractive power has a concave object-side surface 921 in a paraxial region and a concave image-side surface 922 in a paraxial region. The second lens element 920 is made of plastic material and the object-side surface 921 and the image-side surface 922 thereof are aspheric.

The third lens element 930 with positive refractive power has a convex object-side surface 931 in a paraxial region and a convex image-side surface 932 in a paraxial region. The third lens element 930 is made of plastic material and the object-side surface 931 and the image-side surface 932 thereof are aspheric.

The fourth lens element 940 with negative refractive power has a concave object-side surface 941 in a paraxial region and a convex image-side surface 942 in a paraxial region. The fourth lens element 940 is made of plastic material and the object-side surface 941 and the image-side surface 942 thereof are aspheric.

The fifth lens element 950 with positive refractive power has a concave object-side surface 951 in a paraxial region and a convex image-side surface 952 in a paraxial region. The fifth lens element 950 is made of plastic material and the object-side surface 951 and the image-side surface 952 thereof are aspheric.

The sixth lens element 960 with negative refractive power has a concave object-side surface 961 in a paraxial region, a concave image-side surface 962 in a paraxial region and at least one convex shape in an off-axial region of the image-side surface 962 of the sixth lens element 960. The sixth lens element 960 is made of plastic material and the object-side surface 961 and the image-side surface 962 thereof are aspheric.

The IR-cut filter 970 is made of glass material, wherein the IR-cut filter 970 is located between the sixth lens element 960 and the image plane 980, and will not affect the focal length of the optical imaging lens assembly.

The detailed optical data of the 9th embodiment are shown in Table 17 and the aspheric surface data are shown in Table 18 below.

TABLE 17

9th Embodiment
f = 4.95 mm, Fno = 2.40, HFOV = 35.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.340 | | | | |
| 2 | Lens 1 | 1.721 | ASP | 0.794 | Plastic | 1.535 | 56.3 | 3.34 |
| 3 | | 40.444 | ASP | 0.120 | | | | |
| 4 | Lens 2 | −19.579 | ASP | 0.250 | Plastic | 1.639 | 23.5 | −5.91 |
| 5 | | 4.699 | ASP | 0.438 | | | | |
| 6 | Lens 3 | 12.458 | ASP | 0.441 | Plastic | 1.614 | 25.6 | 4.77 |
| 7 | | −3.784 | ASP | 0.100 | | | | |
| 8 | Lens 4 | −1.687 | ASP | 0.320 | Plastic | 1.633 | 23.4 | −5.22 |
| 9 | | −3.704 | ASP | 0.334 | | | | |
| 10 | Lens 5 | −8.396 | ASP | 0.833 | Plastic | 1.544 | 55.9 | 3.33 |
| 11 | | −1.544 | ASP | 0.550 | | | | |
| 12 | Lens 6 | −1.856 | ASP | 0.450 | Plastic | 1.530 | 55.8 | −2.51 |
| 13 | | 5.066 | ASP | 0.500 | | | | |
| 14 | IR-cut filter | Plano | | 0.200 | Glass | 1.517 | 64.2 | — |
| 15 | | Plano | | 0.423 | | | | |
| 16 | Image | Plano | | — | | | | |

Note:
Reference wavelength is 587.6 nm (d-line).

TABLE 18

Aspheric Coefficients

| Surface # | 2 | 3 | 4 | 5 |
|---|---|---|---|---|
| k = | 1.7527E−01 | 9.0917E+00 | 2.0000E+01 | −3.6959E+00 |
| A4 = | −1.9226E−03 | −2.6870E−02 | −4.8821E−02 | −1.8463E−02 |
| A6 = | 5.1729E−04 | 3.6279E−02 | 1.2475E−01 | 8.8712E−02 |
| A8 = | 7.1960E−03 | −4.7819E−03 | −9.8081E−02 | −5.1957E−02 |
| A10 = | −2.0470E−02 | −3.9456E−02 | 1.8316E−02 | 2.1793E−02 |
| A12 = | 2.0485E−02 | 3.6368E−02 | 2.3518E−02 | −1.1167E−02 |
| A14 = | −7.9800E−03 | −1.4103E−02 | −1.3892E−02 | 1.3876E−02 |

| Surface # | 6 | 7 | 8 | 9 |
|---|---|---|---|---|
| k = | −1.0000E+00 | −1.0000E+00 | −1.2279E+00 | −1.0488E+01 |
| A4 = | −9.0613E−02 | 1.0468E−02 | 2.2721E−01 | 9.9385E−02 |
| A6 = | −5.9185E−02 | −7.5926E−02 | −1.7071E−01 | −7.0014E−02 |
| A8 = | 2.8218E−04 | 2.0272E−02 | 1.3401E−01 | 4.5201E−02 |
| A10 = | −3.2820E−03 | −1.4106E−03 | −7.7733E−02 | −2.0248E−02 |
| A12 = | −2.2198E−02 | −4.0661E−03 | 2.4945E−02 | 4.7187E−03 |
| A14 = | 2.6078E−02 | 4.4784E−03 | −3.5831E−03 | −4.3977E−04 |

| Surface # | 10 | 11 | 12 | 13 |
|---|---|---|---|---|
| k = | −1.0000E+00 | −2.2903E+00 | −5.5607E+00 | −4.8550E+00 |
| A4 = | −6.0878E−02 | −1.4136E−02 | −2.1517E−02 | −2.9606E−02 |
| A6 = | 3.8760E−02 | 5.9246E−04 | 7.6690E−03 | 4.4870E−03 |
| A8 = | −1.6047E−02 | 1.0158E−02 | −8.7212E−04 | −7.5712E−04 |
| A10 = | 3.6133E−03 | −4.3190E−03 | 1.7404E−05 | 7.6018E−05 |
| A12 = | −9.0393E−05 | 7.5414E−04 | 5.3574E−06 | −5.4688E−06 |
| A14 = | −4.8627E−05 | −5.0379E−05 | −3.8825E−07 | 1.8116E−07 |

In the optical imaging lens assembly according to the 9th embodiment, the definitions of these parameters shown in the following table are the same as those stated in the 1st embodiment with corresponding values for the 9th embodiment.

| 9th Embodiment | | | |
|---|---|---|---|
| f [mm] | 4.95 | R10/f | −0.31 |
| Fno | 2.40 | (R11 + R12)/(R11 − R12) | −0.46 |
| HFOV [deg.] | 35.8 | f5/f6 | −1.33 |
| N1 | 1.535 | f/f6 | −1.98 |
| V2 | 23.5 | SAG61/T56 | −1.44 |
| V1 − (V2 + V4) | 9.4 | Yc62/f | 0.30 |
| CT5/CT6 | 1.85 | SD/TD | 0.93 |
| R7/f | −0.34 | TTL/ImgH | 1.58 |
| R8/f | −0.75 | | |

The optical imaging lens assembly of the disclosed embodiments above can be applied in an optical imaging device. The arrangement of the optical imaging lens assembly in the optical imaging device provides the benefits of reducing the back focal length of the optical imaging lens assembly for a compact design while balancing the total track length and aberration corrections of the optical imaging device.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:
    a first lens element with positive refractive power having a convex object-side surface in a paraxial region;
    a second lens element having negative refractive power;
    a third lens element having refractive power;
    a fourth lens element with negative refractive power having a concave object-side surface in a paraxial region;
    a fifth lens element with positive refractive power having a convex image-side surface in a paraxial region, wherein both of an object-side surface and the image-side surface of the fifth lens element are aspheric; and
    a sixth lens element with negative refractive power having a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric;
    wherein the optical imaging lens assembly has a total of six lens elements with refractive power, a curvature radius of the object-side surface of the fourth lens element is R7, a curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, and the following relationships are satisfied:

$-1.0<(R11+R12)/(R11-R12)<-0.25;$ $-2.5<R10/f<0;$ and $-0.8<R7/f<0.$

2. The optical imaging lens assembly of claim 1, wherein the second lens element has a concave image-side surface in a paraxial region.

3. The optical imaging lens assembly of claim 2, wherein the third lens element has positive refractive power.

4. The optical imaging lens assembly of claim 1, wherein a refractive index of the first lens element is N1, and the following relationship is satisfied:

$1.45<N1<1.58.$

5. The optical imaging lens assembly of claim 1, wherein the focal length of the optical imaging lens assembly is f, a focal length of the sixth lens element is f6, and the following relationship is satisfied:

$-5<f/f6<-1.5.$

6. The optical imaging lens assembly of claim 1, wherein a curvature radius of an image-side surface of the fourth lens element is R8, the focal length of the optical imaging lens assembly is f, and the following relationship is satisfied:

$-1.2<R8/f<0.$

7. The optical imaging lens assembly of claim 1, wherein a vertical distance from an optical axis to a critical point on the image-side surface of the sixth lens element is Yc62, the focal length of the optical imaging lens assembly is f, and the following relationship is satisfied:

$0.1<Yc62/f<0.7.$

8. The optical imaging lens assembly of claim 1, wherein the curvature radius of the image-side surface of the fifth lens element is R10, the focal length of the optical imaging lens assembly is f, and the following relationship is satisfied:

$-1.2<R10/f<0.$

9. The optical imaging lens assembly of claim 8, wherein the fifth lens element has a convex object-side surface in a paraxial region.

10. The optical imaging lens assembly of claim 8, wherein an f-number of the optical imaging lens assembly is Fno, and the following relationship is satisfied:

$1.40<Fno<2.45.$

11. The optical imaging lens assembly of claim 8, wherein an Abbe number of the first lens element is V1, an Abbe number of the second lens element is V2, an Abbe number of the fourth lens element is V4, and the following relationship is satisfied:

$0<V1-(V2+V4)<30.$

12. The optical imaging lens assembly of claim 8, further comprising:
    an image sensor disposed on an image plane, wherein a half of a diagonal length of an effective photosensitive area on the image sensor is ImgH, an axial distance from the object-side surface of the first lens element to the image plane is TTL, and the following relationship is satisfied:

$TTL/ImgH<1.8.$

13. An optical imaging lens assembly comprising, in order from an object side to an image side:
    a first lens element with positive refractive power having a convex object-side surface in a paraxial region and a concave image-side surface in a paraxial region;
    a second lens element having negative refractive power;
    a third lens element having refractive power;
    a fourth lens element having negative refractive power;
    a fifth lens element with positive refractive power having a convex image-side surface in a paraxial region, wherein both of an object-side surface and the image-side surface of the fifth lens element are aspheric; and
    a sixth lens element with negative refractive power having a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric;
    wherein the optical imaging lens assembly has a total of six lens elements with refractive power; and
    wherein the optical imaging lens assembly further comprises a stop disposed between an object and the second lens element, a curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, an axial distance between the stop and the image-side surface of the sixth lens element is SD, an axial distance between the object-side surface of the first lens element and the image-side surface of the sixth lens element is TD, and the following relationships are satisfied:

$-1.0 < (R11+R12)/(R11-R12) < 0.30;$ $-1.2 < R10/f < 0;$ and $0.82 < SD/TD < 1.0.$ 14. The optical imaging lens assembly of claim 13, wherein the curvature radius of the image-side surface of the fifth lens element is R10, the focal length of the optical imaging lens assembly is f, and the following relationship is satisfied:

$-0.8 < R10/f < 0.$

15. The optical imaging lens assembly of claim 13, wherein an Abbe number of the second lens element is V2, and the following relationship is satisfied:

$10 < V2 < 24.5.$

16. The optical imaging lens assembly of claim 13, wherein a central thickness of the fifth lens element is CT5, a central thickness of the sixth lens element is CT6, and the following relationship is satisfied:

$0.5 < CT5/CT6 < 2.45.$

17. The optical imaging lens assembly of claim 13, wherein the stop is disposed between the object and the first lens element, the axial distance between the stop and the image-side surface of the sixth lens element is SD, the axial distance between the object-side surface of the first lens element and the image-side surface of the sixth lens element is TD, and the following relationship is satisfied:

$0.88 < SD/TD < 1.0.$

18. The optical imaging lens assembly of claim 13, wherein a distance in parallel with an optical axis from an axial vertex on the object-side surface of the sixth lens element to a maximum effective semi-diameter position on the object-side surface of the sixth lens element is SAG61, an axial distance between the fifth lens element and the sixth lens element is T56, and the following relationship is satisfied:

$-2.3 < SAG61/T56 < -0.6.$

19. An optical imaging lens assembly comprising, in order from an object side to an image side:
a first lens element with positive refractive power having a convex object-side surface in a paraxial region;
a second lens element having refractive power;
a third lens element having refractive power;
a fourth lens element having refractive power, wherein both of an object-side surface and an image-side surface of the fourth lens element are aspheric;
a fifth lens element with positive refractive power having a convex image-side surface in a paraxial region, wherein both of an object-side surface and the image-side surface of the fifth lens element are aspheric; and
a sixth lens element with negative refractive power having a concave object-side surface in a paraxial region, a concave image-side surface in a paraxial region and at least one convex shape in an off-axial region of the image-side surface of the sixth lens element, wherein both of the object-side surface and the image-side surface of the sixth lens element are aspheric;
wherein the optical imaging lens assembly has a total of six lens elements with refractive power, and an air distance exists between each lens element on an optical axis; and
wherein the optical imaging lens assembly further comprises a stop disposed between an object and the second lens element, a curvature radius of the image-side surface of the fifth lens element is R10, a curvature radius of the object-side surface of the sixth lens element is R11, a curvature radius of the image-side surface of the sixth lens element is R12, a focal length of the optical imaging lens assembly is f, a focal length of the fifth lens element is f5, a focal length of the sixth lens element is f6, and the following relationships are satisfied:

$-1.0 < (R11+R12)/(R11-R12) < -0.25;$ $-2.5 < R10/f < 0;$ and $-1.30 < f5/f6 < -0.50.$ 20. The optical imaging lens assembly of claim 19, wherein the third lens element has positive refractive power, and the fourth lens element has a concave object-side surface in a paraxial region and a convex image-side surface in a paraxial region.

21. The optical imaging lens assembly of claim 19, wherein a central thickness of the fifth lens element is CT5, a central thickness of the sixth lens element is CT6, and the following relationship is satisfied:

$0.5 < CT5/CT6 < 2.45.$

22. The optical imaging lens assembly of claim 19, wherein the stop is disposed between the object and the first lens element, the axial distance between the stop and the image-side surface of the sixth lens element is SD, the axial distance between the object-side surface of the first lens element and the image-side surface of the sixth lens element is TD, and the following relationship is satisfied:

$0.88 < SD/TD < 1.0.$

23. An optical imaging device comprising, in order from an object side to an image side:
the optical imaging lens assembly of claim 19; and
an image sensor.

* * * * *